US012771908B2

(12) United States Patent
Ding et al.

(10) Patent No.: US 12,771,908 B2
(45) Date of Patent: Oct. 20, 2026

(54) LIVE STREAMING SHARING METHOD, AND RELATED DEVICE AND SYSTEM

(71) Applicant: Tencent Technology (Shenzhen) Company Limited, Shenzhen (CN)

(72) Inventors: Zhixuan Ding, Shenzhen (CN); Pinxian Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/665,438

(22) Filed: May 15, 2024

(65) Prior Publication Data

US 2024/0298077 A1 Sep. 5, 2024

Related U.S. Application Data

(63) Continuation of application No. 16/862,181, filed on Apr. 29, 2020, now Pat. No. 12,022,160, which is a
(Continued)

(51) Int. Cl.
*H04N 21/4788* (2011.01)
*G06F 3/01* (2006.01)
(Continued)

(52) U.S. Cl.
CPC ......... *H04N 21/4788* (2013.01); *G06F 3/011* (2013.01); *G06T 1/20* (2013.01);
(Continued)

(58) Field of Classification Search
CPC ........... H04N 21/4788; H04N 21/2187; H04N 21/436; H04N 21/8146; H04N 21/4781;
(Continued)

(56) References Cited

U.S. PATENT DOCUMENTS

2013/0247120 A1* 9/2013 Milgramm ......... H04N 21/4882 725/110
2014/0080592 A1 3/2014 Shuster
(Continued)

FOREIGN PATENT DOCUMENTS

CN 106303554 A 1/2014
CN 105657438 A 6/2016
(Continued)

OTHER PUBLICATIONS

Tencent Technology, ISR/WO, PCT/CN2017/119852, Sep. 29, 2018, 7 pgs.
(Continued)

*Primary Examiner* — Oschta I Montoya
(74) *Attorney, Agent, or Firm* — Morgan, Lewis & Bockius LLP

(57) ABSTRACT

A live streaming sharing system includes a first live streaming sharing apparatus, a server, and a second live streaming sharing apparatus. The server receives first live streaming data transmitted by a first live streaming sharing apparatus; receives a remote live streaming instruction transmitted by a second live streaming sharing apparatus; and transmits the first live streaming data to the second live streaming sharing apparatus according to the remote live streaming instruction. The second live streaming sharing apparatus is configured to generate and present first virtual reality (VR) live streaming data accordingly. The present disclosure achieves an effect of sharing VR content among a plurality of users, thus improving the interactivity and practicability of the solution.

12 Claims, 14 Drawing Sheets

Related U.S. Application Data continuation of application No. PCT/CN2017/119852, filed on Dec. 29, 2017.

(51) Int. Cl.

| | |
|---|---|
| ***G06T 1/20*** | (2006.01) |
| ***H04N 21/2187*** | (2011.01) |
| ***H04N 21/436*** | (2011.01) |
| ***H04N 21/81*** | (2011.01) |

(52) U.S. Cl.

CPC ....... *H04N 21/2187* (2013.01); *H04N 21/436* (2013.01); *H04N 21/8146* (2013.01)

(58) Field of Classification Search

CPC .. H04N 21/8549; H04N 21/858; G06F 3/011; G06F 9/452; G06T 1/20; A63F 13/211; A63F 13/212; A63F 13/25; A63F 13/355; A63F 13/428; A63F 13/5255; A63F 13/86; H04L 65/4015; H04L 65/611

See application file for complete search history.

(56) References Cited

U.S. PATENT DOCUMENTS

| | | | | |
|---|---|---|---|---|
| 2018/0255332 | A1* | 9/2018 | Heusser | H04H 20/18 |
| 2018/0285129 | A1* | 10/2018 | Mangino | G09G 5/377 |
| 2020/0228524 | A1* | 7/2020 | Szafranski | A63F 13/79 |

FOREIGN PATENT DOCUMENTS

| | | | |
|---|---|---|---|
| CN | 106534142 | A | 3/2017 |
| CN | 106790553 | A | 5/2017 |
| CN | 107277599 | A | 10/2017 |
| CN | 107424332 | A | 12/2017 |

OTHER PUBLICATIONS

Tencent Technology, IPRP, PCT/CN2017/119852, Jun. 30, 2020, 5 pgs.

* cited by examiner (a)

(b)

LIVE STREAMING SHARING METHOD, AND RELATED DEVICE AND SYSTEM

CROSS-REFERENCE TO RELATED APPLICATION

This application is a continuation application of U.S. application Ser. No. 16/862,181, entitled "LIVE BROADCAST SHARING METHOD, AND RELATED DEVICE AND SYSTEM" filed on Apr. 29, 2020, which is a continuation application of PCT Application No. PCT/CN2017/119852, entitled "LIVE BROADCAST SHARING METHOD, AND RELATED DEVICE AND SYSTEM" filed on Dec. 29, 2017, both of which is incorporated by reference in their entirety.

FIELD OF THE TECHNOLOGY

The present disclosure relates to the field of virtual reality technologies, and in particular, to a live streaming sharing method, and a related device and system.

BACKGROUND OF THE DISCLOSURE

Virtual reality (VR) is a vivid virtual environment integrating senses of vision, hearing, touch, smell, taste and the like generated by using a modern high-tech means based on computer technologies. From his/her own point of sight, a user interacts with objects in a virtual world in a natural way by using special input and output devices. With the popularization of VR hardware devices, the conventional social activities also gradually turn to the field of VR, to allow different VR players to come to the same VR scene. Multiple VR players interact with each other by using a controller.

In the current solutions, a user is allowed to operate his/her own terminal desktop under VR, or the user is allowed to experience a game or watch a local video on a huge screen of a virtual environment just like in a movie theater.

However, the above solutions are all oriented to VR experience content of a single user, and therefore is limited in some degree. Moreover, with an increase in social demands, single-player experience of VR content lacks interactivity, thus reducing the practicability of the solutions.

SUMMARY

Embodiments of the present disclosure provide a live streaming sharing method, and a related device and system, achieving an effect of sharing VR content among a plurality of users, thus improving the interactivity and practicability of the solution.

In view of this, according to a first aspect of the present disclosure, a live streaming sharing method is provided. The method is applied to a live streaming sharing system, the live streaming sharing system includes a first live streaming sharing apparatus, a server, and a second live streaming sharing apparatus, and the method includes:

- receiving, by the first live streaming sharing apparatus, a local live streaming instruction through a VR display screen, the VR display screen being used for receiving an operation instruction of a live streaming initiator;
- obtaining, by the first live streaming sharing apparatus, local first live streaming data of the first live streaming sharing apparatus according to the local live streaming instruction; and
- transmitting, by the first live streaming sharing apparatus, the local first live streaming data to the server, wherein the server transmits the local first live streaming data to the second live streaming sharing apparatus, the local first live streaming data being used by the second live streaming sharing apparatus to generate and present first VR live streaming data.

According to a second aspect of the present disclosure, a live streaming sharing method is provided. The method is applied to a live streaming sharing system, the live streaming sharing system includes a first live streaming sharing apparatus, a server, and a second live streaming sharing apparatus, and the method includes:

- receiving, by the second live streaming sharing apparatus, a remote live streaming instruction through a VR display screen;
- obtaining, by the second live streaming sharing apparatus, first live streaming data from the server according to the remote live streaming instruction, the first live streaming data being live streaming data transmitted by the first live streaming sharing apparatus to the server; and
- generating and presenting, by the second live streaming sharing apparatus, first VR live streaming data according to the first live streaming data.

According to a third aspect of the present disclosure, a live streaming sharing method is provided. The method is applied to a live streaming sharing system, the live streaming sharing system includes a first live streaming sharing apparatus, a server, and a second live streaming sharing apparatus, and the method includes:

- receiving, by the server, first live streaming data transmitted by the first live streaming sharing apparatus, the first live streaming data being local first live streaming data of the first live streaming sharing apparatus obtained by the first live streaming sharing apparatus according to a local live streaming instruction;
- receiving, by the server, a remote live streaming instruction transmitted by the second live streaming sharing apparatus; and
- transmitting, by the server, the first live streaming data to the second live streaming sharing apparatus according to the remote live streaming instruction, so that the second live streaming sharing apparatus generates and presents first VR live streaming data.

According to a fourth aspect of the present disclosure, a live streaming sharing apparatus is provided. The live streaming sharing apparatus is a first live streaming sharing apparatus applied to a live streaming sharing system, the live streaming sharing system further includes a server and a second live streaming sharing apparatus, and the live streaming sharing apparatus includes:

- a receiving module, configured to receive a local live streaming instruction through a VR display screen, the VR display screen being used for receiving an operation instruction of a live streaming initiator;
- an obtaining module, configured to obtain local first live streaming data of the first live streaming sharing apparatus according to the local live streaming instruction received by the receiving module; and
- a transmitting module, configured to transmit the first live streaming data obtained by the obtaining module to the server, so that the server transmits the first live streaming data to the second live streaming sharing apparatus, the first live streaming data being used by the second live streaming sharing apparatus to generate and present first VR live streaming data.

According to a fifth aspect of the present disclosure, a live streaming sharing apparatus is provided. The live streaming sharing apparatus is a second live streaming sharing apparatus applied to a live streaming sharing system, the live streaming sharing system further includes a server and a first live streaming sharing apparatus, and the live streaming sharing apparatus includes:

a receiving module, configured to receive a remote live streaming instruction through a VR display screen;

an obtaining module, configured to obtain first live streaming data from the server according to the remote live streaming instruction received by the receiving module, the first live streaming data being live streaming data transmitted by the first live streaming sharing apparatus to the server; and a presenting module, configured to generate and present first VR live streaming data according to the first live streaming data obtained by the obtaining module.

According to a sixth aspect of the present disclosure, a server is provided. The server is applied to a live streaming sharing system, the live streaming sharing system further includes a first live streaming sharing apparatus and a second live streaming sharing apparatus, and the server includes:

a receiving module, configured to receive first live streaming data transmitted by the first live streaming sharing apparatus, the first live streaming data being local first live streaming data of the first live streaming sharing apparatus obtained by the first live streaming sharing apparatus according to a local live streaming instruction;

the receiving module, configured to receive a remote live streaming instruction transmitted by the second live streaming sharing apparatus; and a transmitting module, configured to transmit, according to the remote live streaming instruction received by the receiving module, the first live streaming data received by the receiving module to the second live streaming sharing apparatus, so that the second live streaming sharing apparatus generates and presents first VR live streaming data.

According to a seventh aspect, a live streaming sharing apparatus is provided. The live streaming sharing apparatus is a first live streaming sharing apparatus applied to a live streaming sharing system, the live streaming sharing system further includes a server and a second live streaming sharing apparatus, and the live streaming sharing apparatus includes: a memory, a transceiver, a processor, and a bus system;

the memory being configured to store a program;

the processor being configured to execute the program in the memory, to perform the following operations:

receiving a local live streaming instruction through a VR display screen, the VR display screen being used for receiving an operation instruction of a live streaming initiator;

obtaining local first live streaming data of the first live streaming sharing apparatus according to the local live streaming instruction; and transmitting the first live streaming data to the server, so that the server transmits the first live streaming data to the second live streaming sharing apparatus, the first live streaming data being used by the second live streaming sharing apparatus to generate and present first VR live streaming data; and the bus system being configured to connect the memory and the processor, causing the memory and the processor to communicate with each other.

According to an eighth aspect of the present disclosure, a live streaming sharing apparatus is provided. The live streaming sharing apparatus is a second live streaming sharing apparatus applied to a live streaming sharing system, the live streaming sharing system further includes a server and a first live streaming sharing apparatus, and the live streaming sharing apparatus includes: a memory, a transceiver, a processor, and a bus system;

the memory being configured to store a program;

the processor being configured to execute the program in the memory, to perform the following operations:

receiving a remote live streaming instruction through a VR display screen;

obtaining first live streaming data from the server according to the remote live streaming instruction, the first live streaming data being live streaming data transmitted by the first live streaming sharing apparatus to the server; and generating and presenting first VR live streaming data according to the first live streaming data; and the bus system being configured to connect the memory and the processor, causing the memory and the processor to communicate with each other.

According to a ninth aspect of the present disclosure, a server is provided. The server is applied to a live streaming sharing system, the live streaming sharing system further includes a first live streaming sharing apparatus and a second live streaming sharing apparatus, and the server includes: a memory, a transceiver, a processor, and a bus system;

the memory being configured to store a program;

the processor being configured to execute the program in the memory, to perform the following operations:

receiving first live streaming data transmitted by the first live streaming sharing apparatus, the first live streaming data being local first live streaming data of the first live streaming sharing apparatus obtained by the first live streaming sharing apparatus according to a local live streaming instruction;

receiving a remote live streaming instruction transmitted by the second live streaming sharing apparatus; and transmitting the first live streaming data to the second live streaming sharing apparatus according to the remote live streaming instruction, so that the second live streaming sharing apparatus generates and presents first VR live streaming data; and the bus system being configured to connect the memory and the processor, causing the memory and the processor to communicate with each other.

According to a tenth aspect of the present disclosure, a non-transitory computer storage medium storing a computer program is provided, the program, the program implementing the method according to the first aspect, the second aspect, or the third aspect above when being executed by the processor.

According to an eleventh aspect of the present disclosure, a non-transitory computer program product including an instruction is provided, when being run on a computer, the computer program product causing the computer to perform the method according to the first aspect, the second aspect or the third aspect above.

In the embodiments of the present disclosure, a live streaming sharing method is provided. The method is applied to a live streaming sharing system, and the live streaming sharing system includes a first live streaming sharing apparatus, a server, and a second live streaming sharing apparatus. The first live streaming sharing apparatus first receives a local live streaming instruction through a VR display screen, then obtains first live streaming data according to the local live streaming instruction, and finally transmits the first live streaming data to the server, so that the server transmits the first live streaming data to the second live streaming sharing apparatus. The second live streaming sharing apparatus presents first VR live streaming data. By using the foregoing method, the second live streaming sharing apparatus can synchronously obtain the first live streaming data transmitted by the first live streaming sharing apparatus, and present the first live streaming data, to achieve the objective of sharing VR content among a plurality of users, thus improving the interactivity and practicability of the solution.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of rather than all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms “first”, “second”, “third”, “fourth”, and so on (if existing) are intended to distinguish between similar objects rather than describe a specific order or sequence. It is to be understood that the data used in such a way is interchangeable in proper cases, so that the embodiments described herein can be implemented in other orders than the order illustrated or described herein. Moreover, the terms “include”, “contain” and any other variants mean to cover the non-exclusive inclusion. For example, a process, method, system, product, or device that includes a list of steps or units is not necessarily limited to those units, but may include other units not expressly listed or inherent to such a process, method, system, product, or device.

Figure 1:
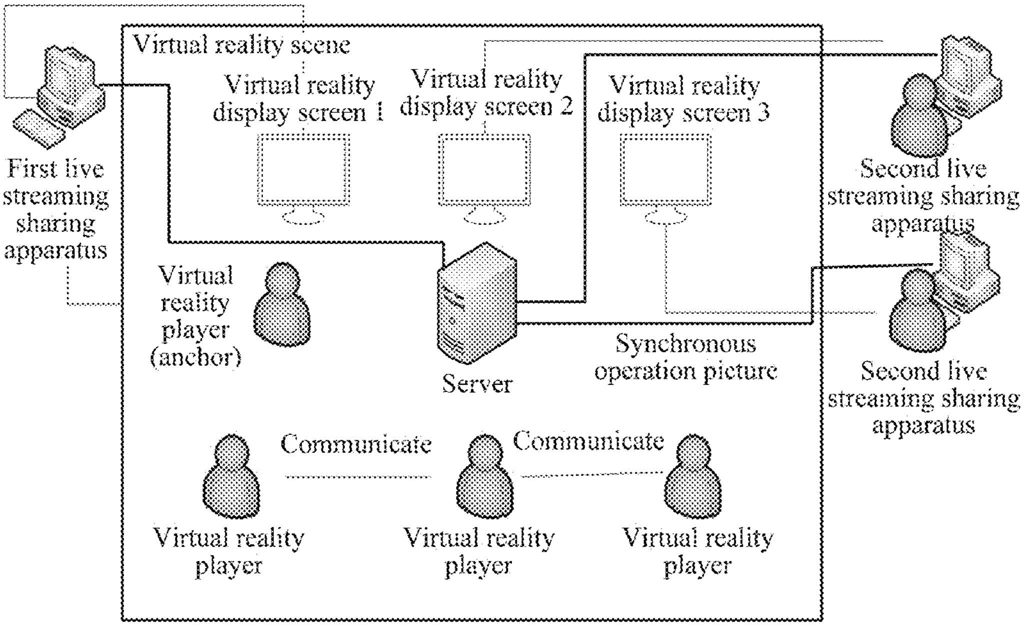
FIG. 1 is a schematic architectural diagram of a live streaming sharing system according to an embodiment of the present disclosure.

It is to be appreciated that, the present disclosure is applied to a multimedia information sharing system. FIG. 1 is an architectural diagram of a live streaming sharing system according to an embodiment of the present disclosure. As shown in FIG. 1, three VR live streaming screens and four VR players shown in the figure are merely an example. In an actual application, there may be more or fewer VR players and VR display screens, which are not limited herein.

Referring to FIG. 1, the whole process of generating and sharing a VR multimedia file is as follows: First, an anchor VR player presents a synchronous operation picture on a VR display screen through a personal computer (PC), where an external VR output device needs to be connected to the PC before the VR display screen is presented, so that a VR signal can be outputted. For example, content to be live-streamed is selected on the VR display screen; alternatively, the anchor starts live streaming and uploads live streaming data to a server through the PC, so that the server forwards the live streaming data to other PCs. At the same time, the live streaming data is presented on a VR display screen 1 by using a VR technology, that is, a desktop is rendered to the VR display screen through mapping.

Other VR players receive the live streaming data of the PC of the anchor from the server in real time, perform decompression to restore the live streaming data, and also render pictures to the VR display screens of the scene through mapping. For example, an audience A can request, on a local PC, the server to provide the live streaming data transmitted by the anchor. Then, the server can transmit, to a VR display screen 2 according to the request of the audience, the live streaming data transmitted by the anchor in real time, so that the audience A can enjoy, on the VR display screen 2, the live streaming data that is currently played by the anchor.

The VR technology is a computer simulation system that can create and experience a virtual world, where the system uses a computer to generate a virtual environment, and is an interactive 3D dynamic view and entity-behavior system with multi-source information fusion, so that the user is immersed in the environment.

This application is intended to allow a user to integrate desktop operations with live streaming sharing in VR. By using the solution provided in this application, each user can operate his/her own computer desktop in a VR social scene. Based on this, the user can browse a web page, make a speech with a presentation file, or experience a game on a projected virtual screen in VR, and share the footage with users in the same scene through live streaming, or watch a live stream shared by another person together with other users. In addition, this application also allows the user to host a concert or an electronic sports game in VR by combining live streaming sharing uploaded in real time through a non-VR client with a VR virtual scene.

Figure 2:
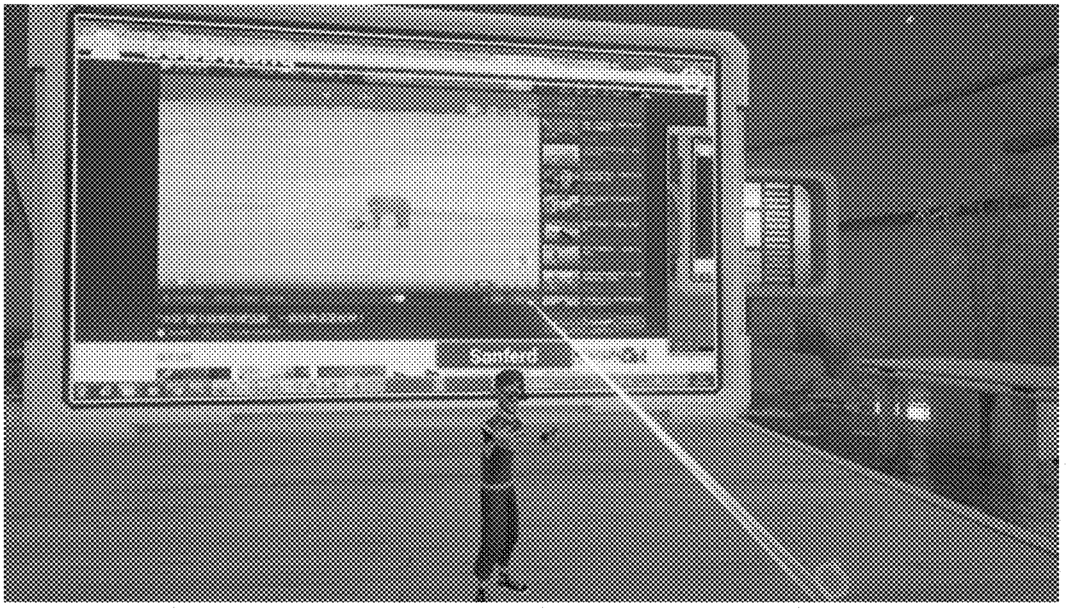
FIG. 2 is a screenshot of a scene of virtual reality live streaming sharing according to an embodiment of the present disclosure.
Figure 2:
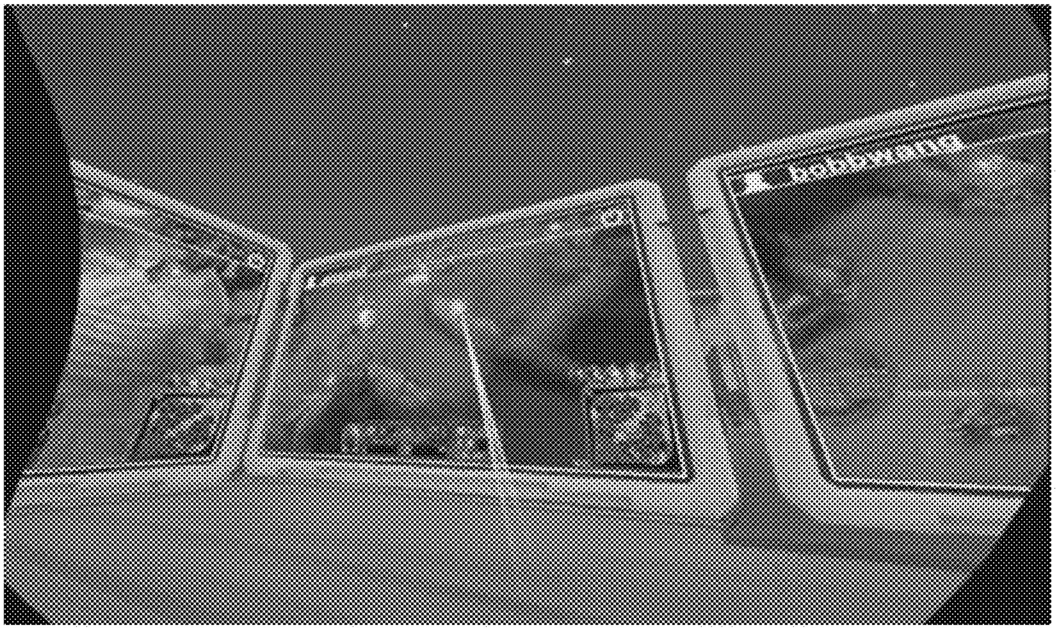

A main process of live streaming sharing is completed by using a virtual screen (that is, the VR display screen) in the scene. The user can freely arrange a plurality of VR display screens in the scene, and each VR display screen in the scene provides two optional functions for the user, that is, a local mode and a remote mode. For ease of description, FIG. 2 is a screenshot of a scene of virtual reality live streaming sharing according to an embodiment of the present disclosure. As shown in FIG. 2, the scene shown in FIG. 2(*a*) is a scene in a local mode, where a user or a player can project live streaming data to a VR display screen through a computer desktop. The scene shown in FIG. 2(*b*) is a scene in a remote mode, where a user can select and watch live streaming content of other users through a VR display screen.

Figure 3:
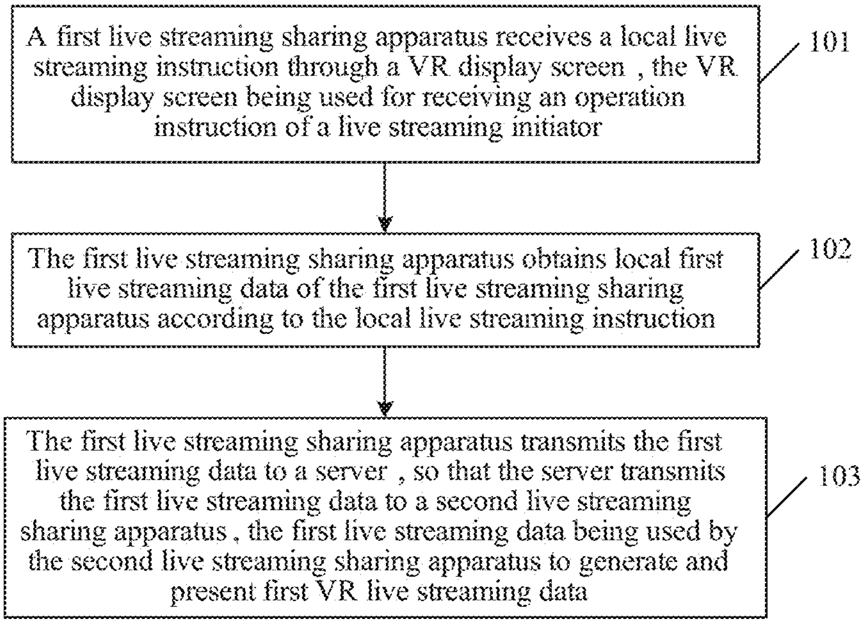
FIG. 3 is a schematic diagram of an embodiment of a live streaming sharing method according to an embodiment of the present disclosure.

A live streaming sharing method in the present disclosure is described in the following from the perspective of a first live streaming sharing apparatus. The method is applied to a live streaming sharing system, and the live streaming sharing system includes the first live streaming sharing apparatus, a server, and a second live streaming sharing apparatus. Referring to FIG. 3, an embodiment of the live streaming sharing method in the embodiments of the present disclosure includes the following steps:

101. The first live streaming sharing apparatus receives a local live streaming instruction through a VR display screen, the VR display screen being used for receiving an operation instruction of a live streaming initiator.

In this embodiment, the first live streaming sharing apparatus may be a terminal device including a VR display screen and a user local. The terminal device may be a PC, a mobile phone, a tablet computer, or the like. In addition, the first live streaming sharing apparatus may further include a user-operated external controller, and an operation instruction may be initiated to the VR display screen through the external controller, for example, a drag instruction, a slide instruction, or a selection instruction.

Figure 4:
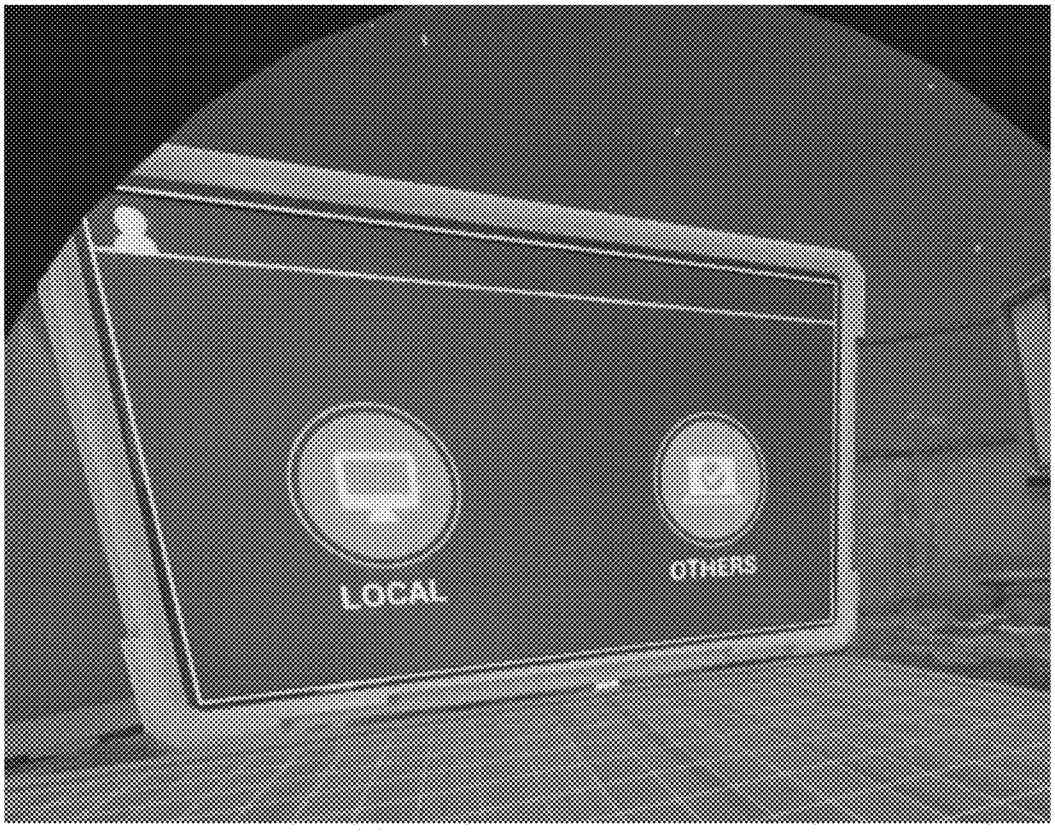
FIG. 4 is a schematic diagram of an interface of selecting local live streaming according to an embodiment of the present disclosure.
Figure 5:
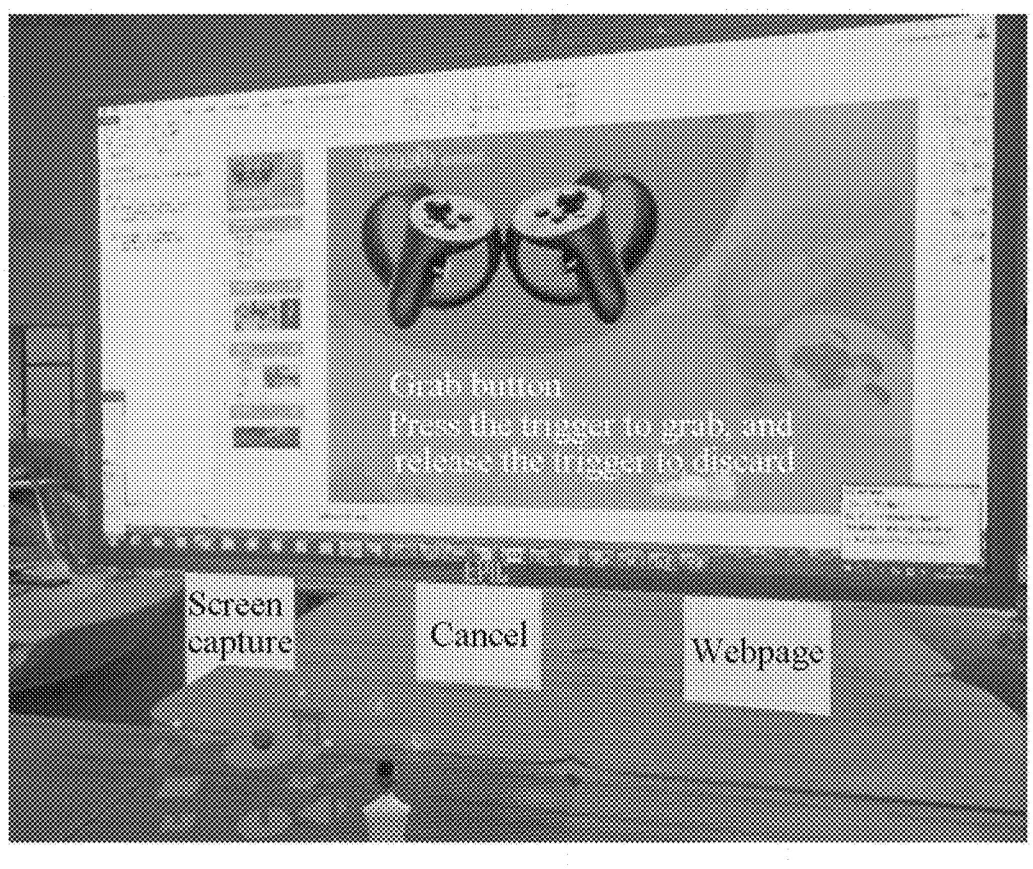
FIG. 5 is a schematic diagram of a VR display screen interface of selecting local live streaming according to an embodiment of the present disclosure.

FIG. 4 is a schematic diagram of an interface of selecting local live streaming according to an embodiment of the present disclosure. As shown in FIG. 4, a user may freely arrange a plurality of VR display screens in a VR scene. Each VR display screen in the scene provides two optional functions for the user, that is, a "LOCAL" mode and an "OTHERS" mode. The "LOCAL" mode is a local mode, and the "OTHERS" mode is a remote mode. FIG. 5 is a schematic diagram of a VR display screen interface of selecting local live streaming according to an embodiment of the present disclosure. A user may transmit a local live streaming instruction through a VR display screen, that is, selecting the "Local" mode. The "Local" mode allows the user to project his/her current terminal device desktop to the VR display screen in the scene, where picture sharing is synchronous, and other users in the scene can also see, through the VR display screen, the terminal device desktop shared by the user.

102. The first live streaming sharing apparatus obtains local first live streaming data of the first live streaming sharing apparatus according to the local live streaming instruction.

In this embodiment, the first live streaming sharing apparatus may obtain local first live streaming data according to a local live streaming instruction triggered by a user. The first live streaming data is data generated during live streaming of an anchor, for example, a game live streaming commentary (a displayed interface is a game interface) or an anchor video (a displayed interface is content captured by a camera).

Figure 6:
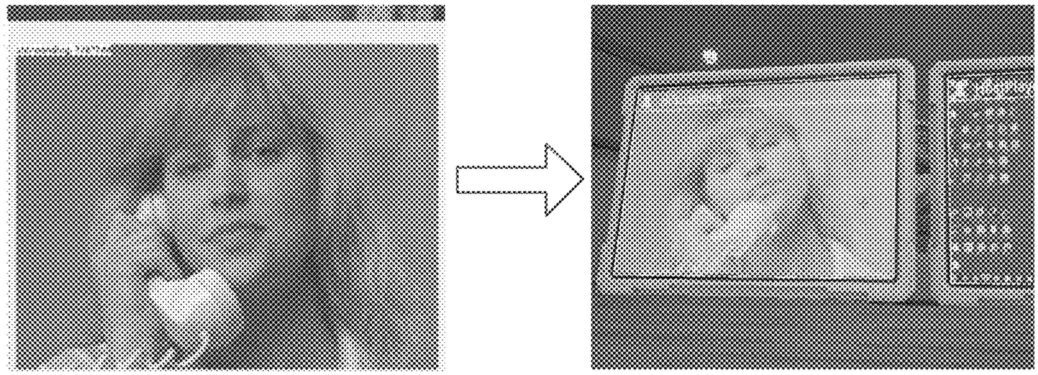
FIG. 6 is a schematic diagram of an interface of mapping local live streaming to a VR display screen according to an embodiment of the present disclosure.

Specifically, FIG. 6 is a schematic diagram of an interface of mapping local live streaming to a VR display screen according to an embodiment of the present disclosure. As shown in FIG. 6, for a user without a VR display screen, desktop content or a video of the user (that is, the first live streaming data) may be directly uploaded to the server in real time through a background client program and used as channel source data, to be watched by audiences in the VR scene.

103. The first live streaming sharing apparatus transmits the first live streaming data to the server, so that the server transmits the first live streaming data to the second live streaming sharing apparatus, the first live streaming data being used by the second live streaming sharing apparatus to generate and present first VR live streaming data.

In this embodiment, the first live streaming sharing apparatus transmits the first live streaming data to the server. At least one second live streaming sharing apparatus downloads the first live streaming data from the server, and then converts the first live streaming data into first VR live streaming data, so that the first VR live streaming data can be watched on the VR display screen. Definitely, the VR display screen herein belongs to the second live streaming sharing apparatus.

In addition, the second live streaming sharing apparatus may further include a terminal device. The terminal device may be a PC, a mobile phone, a tablet computer, or the like. In addition, the second live streaming sharing apparatus may further include a user-operated external controller.

In the embodiments of the present disclosure, a live streaming sharing method is provided. The method is applied to a live streaming sharing system, and the live streaming sharing system includes a first live streaming sharing apparatus, a server, and a second live streaming sharing apparatus. The first live streaming sharing apparatus first receives a local live streaming instruction through a VR display screen, then obtains first live streaming data according to the local live streaming instruction, and finally transmits the first live streaming data to the server, so that the server transmits the first live streaming data to the second live streaming sharing apparatus. The second live streaming sharing apparatus presents first VR live streaming data. By using the foregoing method, the second live streaming sharing apparatus can synchronously obtain the first live streaming data transmitted by the first live streaming sharing apparatus, and present the first live streaming data, to achieve the objective of sharing VR content among a plurality of users, thus improving the interactivity and practicability of the solution.

In some embodiments, based on the embodiment corresponding to FIG. 3, in a first optional embodiment of the live streaming sharing method provided in the embodiments of the present disclosure, the obtaining, by the first live streaming sharing apparatus, local first live streaming data of the first live streaming sharing apparatus according to the local live streaming instruction may include:

obtaining, by the first live streaming sharing apparatus, a desktop texture through a multimedia programming interface, the desktop texture being captured by using a desktop window manager (DWM); and generating, by the first live streaming sharing apparatus, the local first live streaming data of the first live streaming sharing apparatus according to the desktop texture, the first live streaming data being bitmap data.

In this embodiment, a method for obtaining the first live streaming data in a Windows 7 (an operating system developed by Microsoft) environment is introduced. Because a built-in application programming interface (API) of Windows 7 for obtaining desktop bitmap data has extremely low efficiency and is not suitable for a VR desktop that requires at least 60 frames, a program for capturing a desktop screen in Win7 uses a technology adopted by a QQ remote desktop, that is, a full screen capture technology (desktop window manager, DWM). Compared with the interface provided by Windows, this solution reduces the time for capturing a single frame from 45 ms to 4 ms, thus improving the quantity of frames and implementing desktop capture in VR.

The DWM is a new component in Windows Vista and Windows 7. The DWM is established based on a windows presentation foundation (WPF) core graphics layer component of Windows. Desktop composition of the DWM is a new feature based on a composition engine. The emerging of the DWM almost changes the screen pixel display manner of an application program in Vista. After the DWM is enabled, provided visual effects include an Aero Glass frame, 3D window transformation animations, window flipping and high resolution support.

Figure 7:
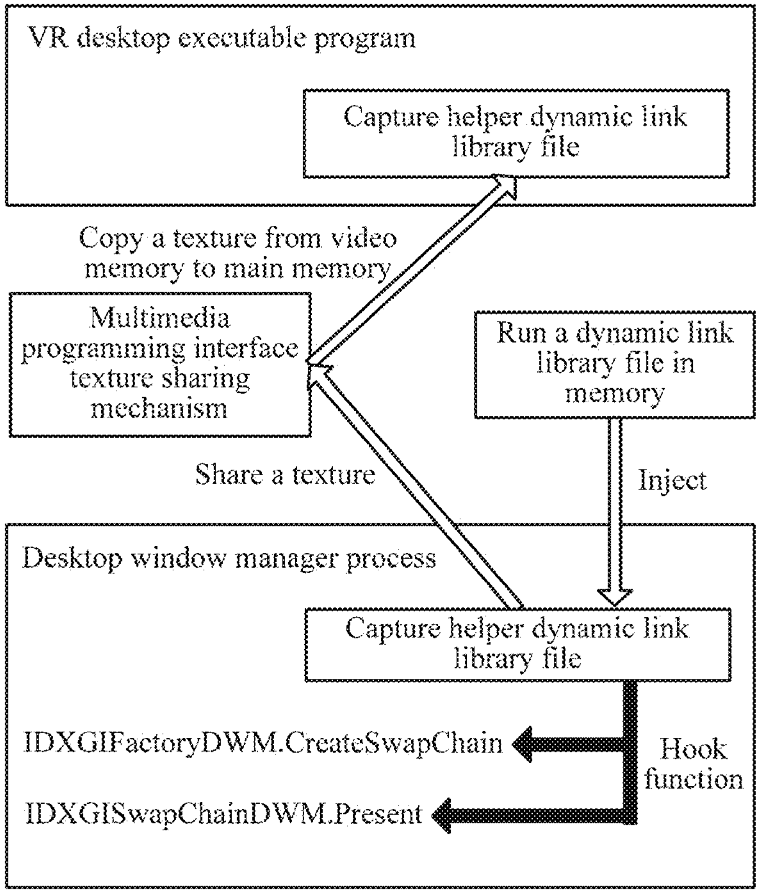
FIG. 7 is a topological diagram of a full screen capture technology according to an embodiment of the present disclosure.

Specifically, FIG. 7 is a topological diagram of a full screen capture technology according to an embodiment of the present disclosure. As shown in FIG. 7, a dynamic link library file (Rundll32.exe) running in memory is injected into a capture helper dynamic link library file (CaptureHelper.dll). CaptureHelper.dll invokes a DWM process through a hook function (Hook), and obtains a desktop texture in a "Present" function of a desktop manager "SwapChain". By using a texture sharing mechanism of a multimedia programming interface (DirectX), the shared desktop texture is obtained in a VR desktop executable program. Finally, the desktop texture data is mapped to be bitmap data. It can be appreciated that, the bitmap data is the first live streaming data. Definitely, if the bitmap data is captured on the side of the second live streaming sharing apparatus, the bitmap data is the second live streaming data.

Through the foregoing steps, complete bitmap data of each frame can be obtained with relatively high efficiency in Windows 7, and the bitmap data is uploaded to the server, so as to be synchronized to VR display screens of other members of the room.

In addition, in this embodiment of the present disclosure, because an API for obtaining desktop bitmap data in the Windows 7 operating system has low efficiency and is thus not suitable for a VR display screen that requires a relatively large quantity of frames, the present disclosure proposes using a full screen capture technology for desktop screen capture in Windows 7. By using the foregoing method, complete bitmap data of each frame, that is, live streaming data, can be obtained with relatively high efficiency in the Windows 7 operating system, and the live streaming data is uploaded to the server, so as to be synchronized to other VR display screens.

In some embodiments, based on the embodiment corresponding to FIG. 3, in a second optional embodiment of the live streaming sharing method provided in the embodiments of the present disclosure, the obtaining, by the first live streaming sharing apparatus, local first live streaming data of the first live streaming sharing apparatus according to the local live streaming instruction may include:

obtaining, by the first live streaming sharing apparatus, a desktop texture through a multimedia programming interface, the desktop texture being captured by using a desktop duplication application API; and generating, by the first live streaming sharing apparatus, the local first live streaming data of the first live streaming sharing apparatus according to the desktop texture, the first live streaming data being bitmap data.

In this embodiment, a method for obtaining the first live streaming data in a Windows 8 or Windows 10 (an operating system developed by Microsoft) environment is introduced. An efficient desktop duplication API is introduced in Windows 8. A full-screen desktop can be directly captured by using the desktop duplication API, without hooking a desktop manager process of Windows.

In this solution, a different screen capture mechanism may be selected by determining an operating system type of a user.

Specifically, when it is determined that the current operating system is Windows 8 or Windows 10, the first live streaming sharing apparatus may obtain the desktop texture through a multimedia programming interface (DirectX), where the desktop texture herein is captured by using the desktop duplication API.

The first live streaming sharing apparatus generates the local first live streaming data of the first live streaming sharing apparatus according to the desktop texture, the first live streaming data being bitmap data. The bitmap data is an image represented by a pixel array. Color information of each pixel is expressed by a red green blue (RGB) combination or a grayscale value. According to the color information, required data bits are 1 bit, 4 bits, 8 bits, 16 bits, 24 bits, 32 bits, and the like. Greater data bits indicate richer colors, and a corresponding data amount is also larger.

In addition, in this embodiment of the present disclosure, an efficient desktop duplication interface has been introduced in the Windows 8 or Windows 10 operating system. Therefore, the desktop texture can be obtained through the interface, and then the local first live streaming data of the first live streaming sharing apparatus is directly generated according to the desktop texture. By using the foregoing method, complete bitmap data of each frame, that is, live streaming data, can be obtained with relatively high efficiency in the Windows 8 or Windows 10 operating system, and the live streaming data is uploaded to the server, so as to be synchronized to other VR display screens, thus improving the practicability and feasibility of the solution.

In some embodiments, based on the first or second embodiment corresponding to FIG. 3, in a third optional embodiment of the live streaming sharing method provided in the embodiments of the present disclosure, after the obtaining, by the first live streaming sharing apparatus, local first live streaming data of the first live streaming sharing apparatus according to the local live streaming instruction, the method may further include:

mapping, by the first live streaming sharing apparatus, the first live streaming data to be a map in a graphics processing unit (GPU), to generate the first VR live streaming data; and presenting, by the first live streaming sharing apparatus, the first VR live streaming data.

In this embodiment, because the local desktop picture is provided by an anchor user, bitmap data of the original desktop (that is, the first live streaming data and/or the second live streaming data) needs to be obtained by using the full-screen desktop capture technology at the local first. The bitmap data of the original desktop is arranged in a form of original BGRA, and can be directly mapped to be a map in a GPU. Corresponding video memory in the GPU is directly updated in each frame.

A video picture is drawn to a VR scene through image mapping. Specifically, video frame data is mapped to be a map, then a rectangular mesh model is drawn in the VR display screen, and a map texture is pasted thereon. A specific method of screenshot drawing at a local desktop end is different from a method of remote picture drawing in certain degree. Texture mapping is drawing a texture of a mesh model by acquiring corresponding picture pixels through UV coordinates of each vertex of the mesh model in computer graphics.

Further, in this embodiment of the present disclosure, the live streaming sharing apparatus maps live streaming data to be a map in the GPU, to generate VR live streaming data, and then presents the VR live streaming data. By using the foregoing method, drawing of the local desktop can be completed, thus providing a feasible manner of presenting VR live streaming data on a VR display screen and improving the operability of the solution.

In some embodiments, based on FIG. 3 or any of the first to the third embodiments corresponding to FIG. 3, in a fourth optional embodiment of the live streaming sharing method provided in the embodiments of the present disclosure, the first live streaming data includes an audio and video data stream and state data; and the transmitting, by the first live streaming sharing apparatus, the first live streaming data to the server may include:

transmitting, by the first live streaming sharing apparatus, the audio and video data stream to the server, so that the server compresses the audio and video data stream in real time and generates a compressed data stream, the audio and video data being video and audio data in the first live streaming data; and transmitting, by the first live streaming sharing apparatus, the state data to the server, so that the server synchronizes playing of the first live streaming sharing apparatus and the second live streaming sharing apparatus according to the state data and the compressed data stream.

In this embodiment, the first live streaming data specifically includes an audio and video data stream and state data, where the audio and video data stream may be referred to as media data, and the state data is data for logic synchronization and processing. For example, if the first live streaming sharing apparatus starts to play a clip A at 11:55:08, the state data at this point may carry an identifier "115508A". The server can obtain the identifier "115508A" after receiving and parsing the state data, and then synchronizes the clip A at 11:55:08 corresponding to "115508A" to the second live streaming sharing apparatus.

Definitely, the server further needs to compress the audio and video data stream in real time, to reduce the traffic of the data stream and improve the efficiency of data transmission. The server generates corresponding first live streaming data according to the state data and the compressed data stream, and then transmits the first live streaming data to the second live streaming sharing apparatus.

Further, in this embodiment of the present disclosure, the first live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

In some embodiments, based on FIG. 3 or any of the first to the fourth embodiments corresponding to FIG. 3, in a fifth optional embodiment of the live streaming sharing method provided in the embodiments of the present disclosure, after the transmitting, by the first live streaming sharing apparatus, the first live streaming data to the server, the method may further include:

obtaining, by the first live streaming sharing apparatus, a screen ratio value and real-time operation information through the VR display screen, the screen ratio value being used for representing a ratio between a space coordinate value and a reference coordinate value, and the real-time operation information being used for representing an operation performed by a user on a controller; and generating, by the first live streaming sharing apparatus, a live streaming interaction instruction according to the screen ratio value and the real-time operation information.

In this embodiment, after transmitting the first live streaming data to the server, the first live streaming sharing apparatus may further receive, through the VR display screen, an operation instruction transmitted by the user, generate a screen ratio value and real-time operation information according to the operation instruction, and determine a live streaming interaction instruction according to the screen ratio value and the real-time operation information.

Figure 8:
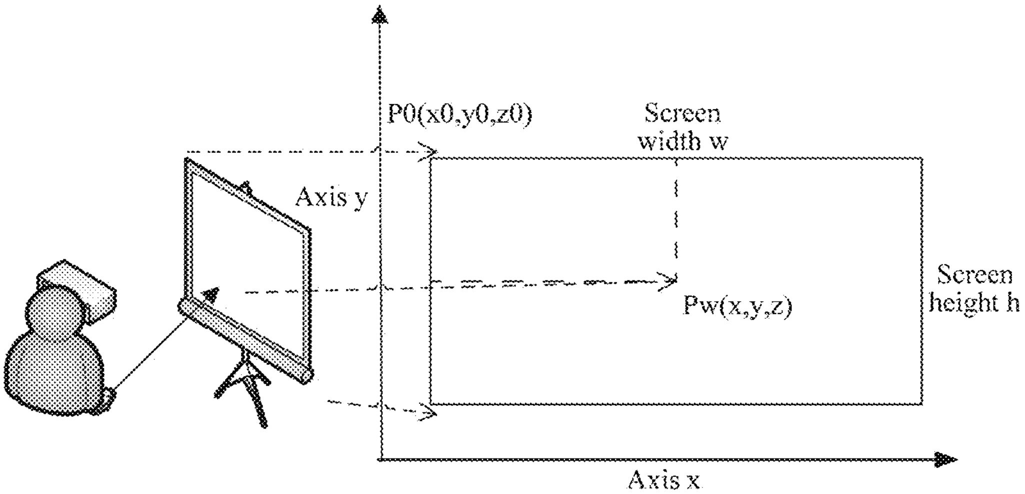
FIG. 8 is a schematic diagram of an embodiment of mapping an input of a user according to an embodiment of the present disclosure.

Specifically, FIG. 8 is a schematic diagram of an embodiment of mapping a user input according to an embodiment of the present disclosure. As shown in FIG. 8, an interaction between a user and a VR display screen is mapped to a mouse operation of a local terminal of the user through an intersection between a controller at the hand of the user and a rectangular projection area of the VR display screen in the VR scene. Specific steps are as follows: First, a space coordinate value between a ray of the controller and the VR display screen is obtained according to an operation instruction that is triggered by the user through the controller, where the controller and the VR display screen both belong to the first live streaming sharing apparatus. The space coordinate value between the ray of the controller and the VR display screen is $P_w(x, y, z)$. Then, a screen ratio value is determined according to the space coordinate value and a reference coordinate value of the VR display screen.

It is assumed that the reference coordinate value of the VR display screen may be a point at the upper left corner of the screen, that is, $P_0(x_0, y_0, z_0)$. A screen ratio value is determined based on a ratio of mapping a coordinate point $P_w(x, y, z)$ to the screen according to the point at the upper left corner of the screen $P_0(x_0, y_0, z_0)$, and the screen ratio value is $P_s(u, v)$.

$$u = (x - x_0)/w;$$

$$v = (y - y_0)/h;$$

where w represents a width value of the VR display screen, and h represents a height value of the VR display screen.

A real-time mouse position of the user $P_m$(um, vm) may be calculated according to calculated $P_s$, where um=u× screen width of the terminal, and vm=v×screen height of the terminal. $P_s$ is the screen ratio value.

The first live streaming sharing apparatus may map a left key and a right key of the mouse according to keys on the external hand controller, and capture the mapping to obtain states of the keys of the mouse, for example, single-click, double-click, and pressing, thus forming real-time operation information. With the position and key pressing mode of the mouse, the screen ratio value and the real-time operation information are obtained. Finally, a user click operation corresponding to the mouse position $P_m$ is mapped to be a mouse event through an API, to determine a live streaming interaction instruction corresponding to the mouse event.

Further, in this embodiment of the present disclosure, the user of local live streaming may further generate a live streaming interaction instruction through interaction between the external controller and the VR display screen, and the live streaming interaction instruction is mapped to be a mouse event. By using the foregoing method, the user can directly generate a live streaming interaction instruction in the VR scene, without operating on a terminal desktop, thus realizing immersive VR experience.

In some embodiments, based on the embodiment corresponding to FIG. 3, in a sixth optional embodiment of the live streaming sharing method according to the embodiments of the present disclosure, the method may further include:

receiving, by the first live streaming sharing apparatus, a remote live streaming instruction through the VR display screen;

obtaining, by the first live streaming sharing apparatus, second live streaming data from the server according to the remote live streaming instruction, the second live streaming data being live streaming data transmitted by the second live streaming sharing apparatus to the server; and generating and presenting, by the first live streaming sharing apparatus, second VR live streaming data according to the second live streaming data.

Figure 9:
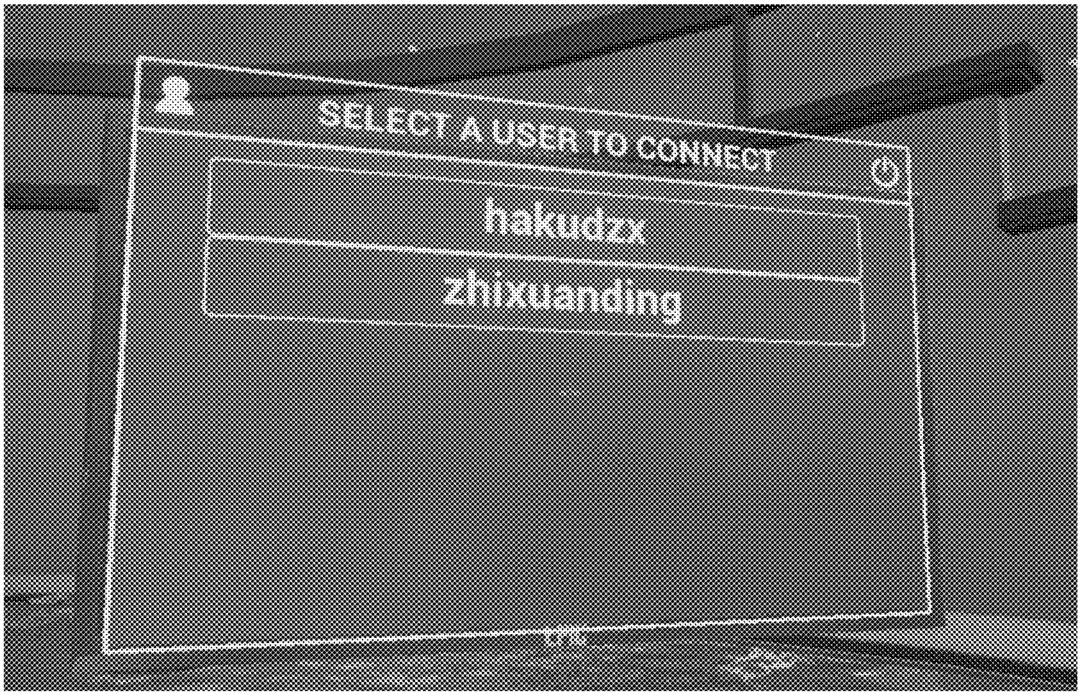
FIG. 9 is a schematic diagram of an interface of selecting remote live streaming according to an embodiment of the present disclosure.

In this embodiment, if the user wants to watch remote live streaming content locally, a remote live streaming instruction may further be triggered through the VR display screen of the first live streaming sharing apparatus. The remote live streaming instruction herein is used for enabling a "Remote" mode. Specifically, FIG. 9 is a schematic diagram of an interface of selecting remote live streaming according to an embodiment of the present disclosure. As shown in FIG. 9, by selecting the "Remote" mode, the user is allowed to watch live streaming content of an existing anchor on the server (that is, local sharing of another user not in the room), just like watching a video live streaming platform. The user selects a room list through the VR display screen of the second live streaming sharing apparatus, for example, the list shown in FIG. 9, i.e., "hakudzx" and "zhixuanding". After selecting a room in the list, the user can watch a video source channel, that is, receive the second live streaming data.

Figure 10:
FIG. 10 is a schematic diagram of a VR display screen interface of selecting remote live streaming according to an embodiment of the present disclosure.

The first live streaming sharing apparatus obtains second live streaming data from the server according to the remote live streaming instruction, and then generates and presents second VR live streaming data according to the second live streaming data. A presenting interface is shown in FIG. 10. FIG. 10 is a schematic diagram of a VR display screen interface of selecting remote live streaming. The user can watch the second VR live streaming data through the VR display screen.

It may be appreciated that, this solution also allows a user to watch live streaming of an anchor like in a conventional live streaming platform, or watch online video content pushed by an official account, or the like, which is not limited herein.

In addition, in this embodiment of the present disclosure, there may be a plurality of VR display screens in a VR scene, and each VR display screen can freely switch between a local mode and a remote mode. By using the foregoing method, social activities in the VR scene seem more abundant, thus improving the diversity and interestingness of the solution.

In some embodiments, based on the sixth embodiment corresponding to FIG. 3, in a seventh optional embodiment of the live streaming sharing method provided in the embodiments of the present disclosure, the generating and presenting, by the first live streaming sharing apparatus, second VR live streaming data according to the second live streaming data may include:

converting, by the first live streaming sharing apparatus, the second live streaming data into the second VR live streaming data according to a correspondence between color codes and color modes; and presenting, by the first live streaming sharing apparatus, the second VR live streaming data.

In this embodiment, the first live streaming sharing apparatus may further draw a remote desktop according to a correspondence between color codes and color modes. The color code may be YUV. YUV is a color encoding method used in a European television system. In a modern color television system, a three-tube color camera or a color charge-coupled device (CCD) camera is usually used to capture an image, then color separation and respective amplification and collection are performed on an obtained color image signal to obtain RGB, and the RGB passes through a matrix conversion circuit to obtain a luminance signal Y and two color difference signals B-Y (that is, U) and R-Y (that is, V). Finally, a transmitting transmit separately encodes the luminance signal and the two color difference signals, and transmits them by using a same channel. This color representation method is YUV color space representation. The importance of a YUV color space is that a luminance signal Y and chrominance signals U and V are separate.

A remote picture refers to desktop or video picture data that is shared by another user and synchronized from the server. To reduce a network transmission bandwidth, a picture obtained through transmission is generally in a YUV420 format, and cannot be drawn directly. Mapping from YUV to RGB is required, and a specific mapping formula is as follows:

$$\begin{bmatrix} R \\ G \\ B \end{bmatrix} = \begin{bmatrix} 1 & 0 & 1.402 \\ 1 & 0.34414 & -0.71414 \\ 1 & 1.1772 & 0 \end{bmatrix} \begin{bmatrix} Y \\ U \\ V \end{bmatrix}.$$

Figure 11:
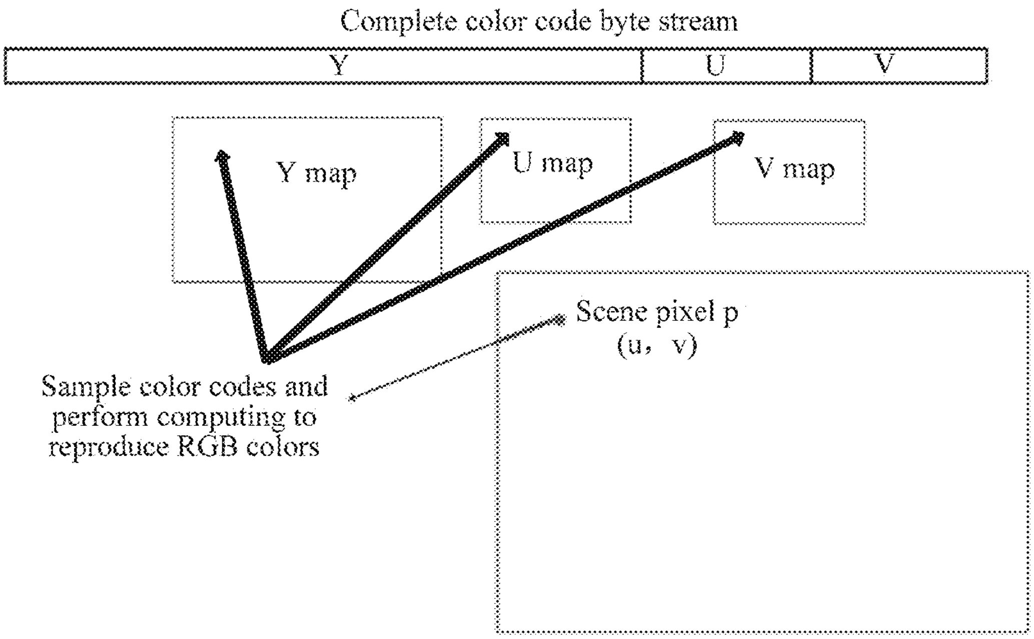
FIG. 11 is a schematic diagram of an embodiment of remote desktop drawing according to an embodiment of the present disclosure.

FIG. 11 is a schematic diagram of an embodiment of remote desktop drawing according to an embodiment of the present disclosure. As shown in FIG. 11, to improve efficiency, mapping calculation from YUV to RGB may be directly performed in a stage of drawing a VR display screen. Specifically, original YUV data is decomposed into Y, U, and V data streams, and is decomposed into three single-channel maps to be mapped to video memory of a user computer. Color reproduction is performed in a pixel coloriser.

In addition, in this embodiment of the present disclosure, a method for remote desktop drawing is introduced. A live streaming sharing apparatus may decompose original YUV data into Y, U, and V data streams, and decompose the data into three single-channel maps to be mapped to video memory of a user terminal, so that color reproduction is performed in a pixel coloriser. By using the foregoing method, color reproduction can be directly performed in the stage of drawing a VR display screen, thus improving the efficiency of color reproduction to enhance the practicability of the solution.

In some embodiments, based on the seventh embodiment corresponding to FIG. 3, in an eighth optional embodiment of the live streaming sharing method provided in the embodiments of the present disclosure, the presenting, by the first live streaming sharing apparatus, the second VR live streaming data may include:

updating, by the first live streaming sharing apparatus, a target map with the second VR live streaming data, the second VR live streaming data including a plurality of VR image frames, the target map including a plurality of data layers, the plurality of data layers being generated after downsampling, and each data layer being used for updating each VR image frame.

Figure 12:
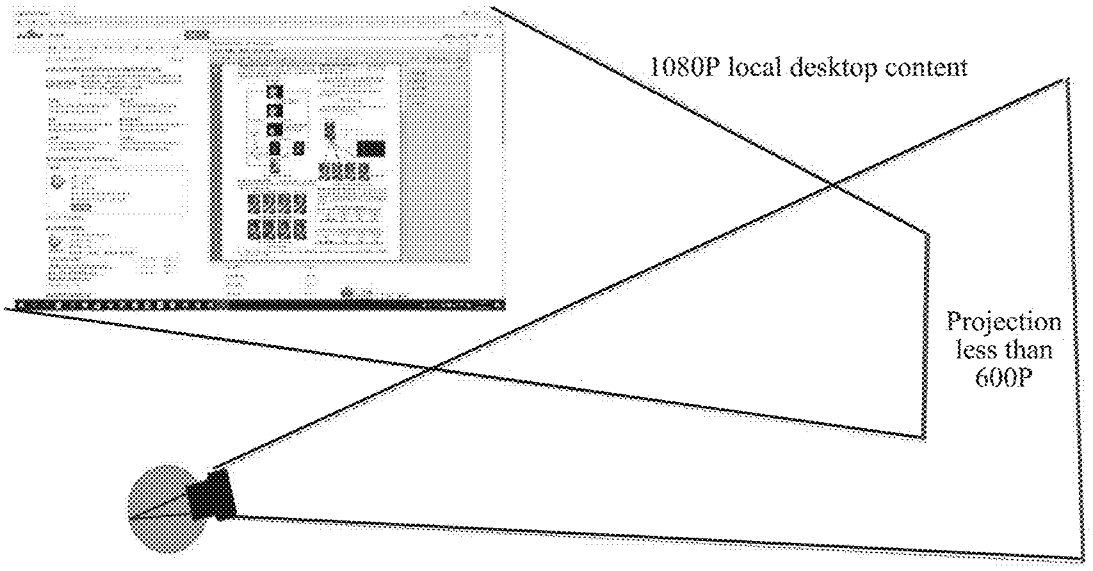
FIG. 12 is a schematic diagram of screen flicker caused by a high-resolution high-frame-rate picture in the existing solution.

In this embodiment, how to reduce screen flicker under the condition of high resolution will be introduced. FIG. 12 is a schematic diagram of screen flicker caused by a high-resolution high-frame-rate picture in the existing solution. As shown in FIG. 12, the resolution of current VR devices is generally about 1080 progressive scanning (P), and a VR camera has an extremely high wide angle, while original video data of a user is already pictures of 1080 P or 720 P. This inevitably causes the problem of loss of data progress. On the other hand, data shared by the user is mostly desktop pictures, and such data is high-frequency data, for example, a web page or an opened document. It finally causes the VR display screen to change as its position in a VR viewing angle of the user changes, resulting in severe flicker and poor experience.

To resolve the problem of flicker, a mapping Mipmap technology may be used, which can also resolve the problem that the resolution of a map in a game is much higher than the resolution of a screen. A computer graphics rendering pipeline allows a user to store a low-resolution part of an extra map for mapping. A video card may use a most appropriate mapping Mipmap according to a ratio between specific pixel mapping resolution and resolution of a screen area in actual mapping in a map sampling process, and perform interpolation to obtain a final result. Different from a map, pictures obtained by decompressing frame data are dynamic. This is unlike the case of static maps, where Mipmap maps are pre-generated. Therefore, a low-resolution map of a frame picture needs to be calculated in real time.

Mipmap is a computer graphics and image technology for achieving a three-dimensional effect in a two-dimensional substitute of a three-dimensional image.

Figure 13:
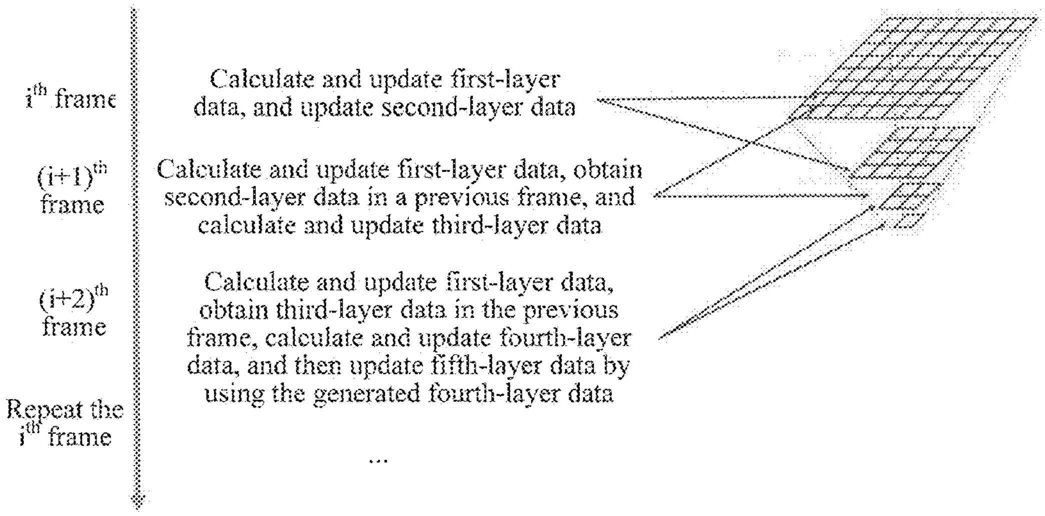
FIG. 13 is a schematic diagram of an embodiment of updating live streaming pictures frame by frame according to an embodiment of the present disclosure.

In this solution, one target map may be established for each VR display screen, and space required for computing the target map Mipmap is additionally applied for in video memory space. The resolution of each layer is half of the resolution of a layer above. Specifically, FIG. 13 is a schematic diagram of an embodiment of updating live streaming pictures frame by frame according to an embodiment of the present disclosure. As shown in FIG. 13, the resolution of the first layer is initialized to be 2048×2048, initialization of mapping Mipmap layers is performed according to a width of Wi=½ Wi and a height of Hi=½ Hi. In an actual project, a Mipmap part of video stream frame data is updated frame by frame.

Then, original data of a VR image in the first frame is downsampled to be half of data of the original map, and then the first data layer of the map, that is, the Mipmap layer is updated. The second Mipmap layer is updated with the obtained first Mipmap layer through downsampling. In the next frame, the first Mipmap layer of the map is further updated, and the third Mipmap layer is also updated with the second Mipmap layer in the previous frame through downsampling.

Similarly, the first Mipmap layer of the map is further updated, and the fourth Mipmap layer is also updated with the third Mipmap layer in the previous frame through downsampling; the fifth Mipmap layer is updated with the updated fourth Mipmap layer in the same manner. So far, sufficient mapping Mipmap layers have been obtained, and it is unnecessary to obtain more Mipmap layers. Therefore, updating can be performed gradually according to the logic of the VR image in the first frame.

Further, in this embodiment of the present disclosure, the live streaming sharing apparatus updates the target map with the VR live streaming data. The second VR live streaming data includes a plurality of VR image frames, and the target map includes a plurality of data layers, the plurality of data layers being generated after downsampling, and each data layer being used for updating each VR image frame. By using the foregoing method, loss of data progress can be reduced, and flicker of the VR display screen when displaying VR live streaming data is reduced, thus improving the application experience.

Figure 14:
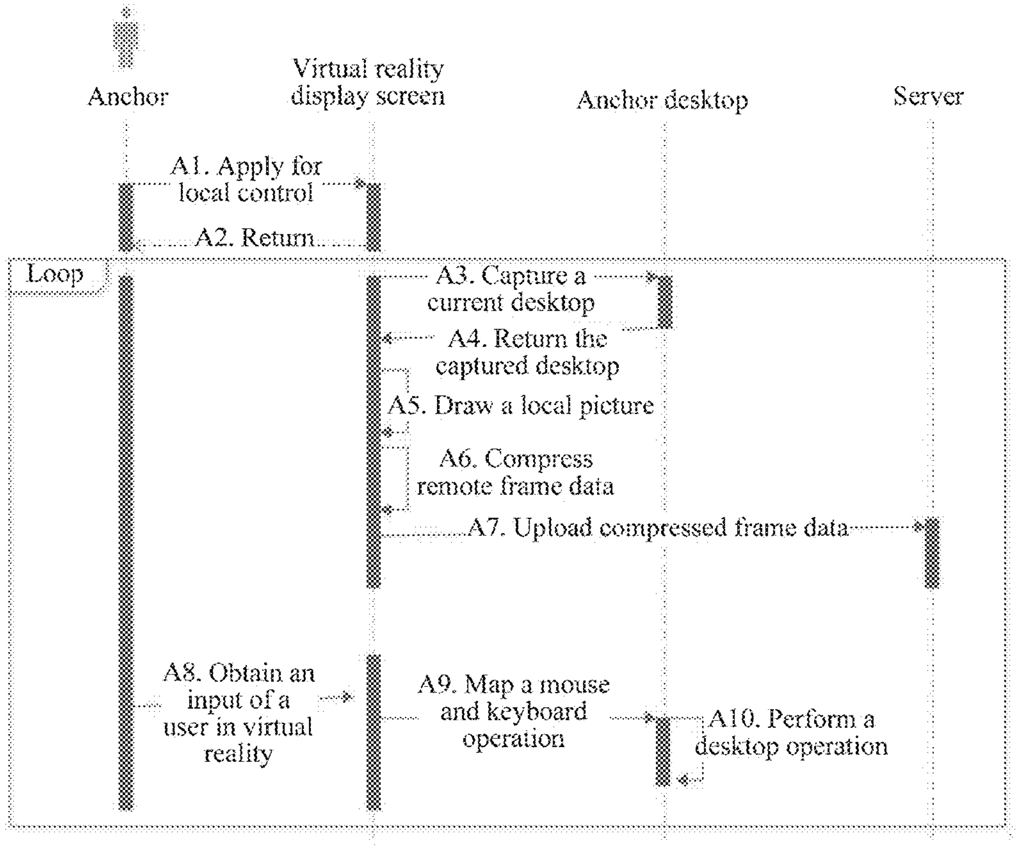
FIG. 14 is a schematic flowchart of a local mode in an application scenario according to the present disclosure.

For ease of understanding, a process of selecting a local mode is illustrated in the following with a specific application scenario. FIG. 14 is a schematic flowchart of a local mode in an application scenario according to the present disclosure. Specifically:

In step A1, an anchor may apply for control in a "Local" mode, that is, the anchor applies to a VR display screen in a scene for control in a "Local" mode, and waits for the VR display screen to return an application result.

In step A2, the VR display screen returns an application result according to the application for the "Local" mode.

In step A3, the VR display screen can capture a current desktop, that is, a local VR display screen captures a player-controlled computer desktop picture.

In step A4, the VR display screen returns the captured desktop picture, and the local VR display screen stores the picture of the current frame in a form of two-dimensional image data BGRA arrangement array.

In step A5, the VR display screen draws a local picture, that is, the local VR display screen delivers frame picture data to video memory, so as to display the data in a form of a map in the VR display screen.

In step A6, the VR display screen compresses remote frame data, that is, the local VR display screen transcodes the two-dimensional image data BGRA arrangement array into color code YUV420 frame data, further performs compression in real time by using an audio and video component, and submits a compressed data result to a server.

In step A7, the VR display screen uploads frame data to the server, that is, the local VR display screen uploads compressed frame data to the server.

In step A8, the VR display screen can obtain an input of a user in a VR scene, that is, the local VR display screen calculates a result of an intersection between a ray of a controller in the VR scene and a rectangular area of the VR display screen in the scene, and captures a controller key of the user.

In step A9, the anchor triggers, to an anchor desktop through the VR display screen, an operation of mapping a mouse and a keyboard, that is, mapping to a mouse operation result according to the calculated result of the intersection between the ray emitted by the controller and the rectangular area of the VR display screen.

In step A10, the anchor desktop may perform the user's operation on the desktop, that is, mapped mouse and keyboard operation information is inputted through a Windows API, and the anchor desktop can also receive the operation in real time.

Figure 15:
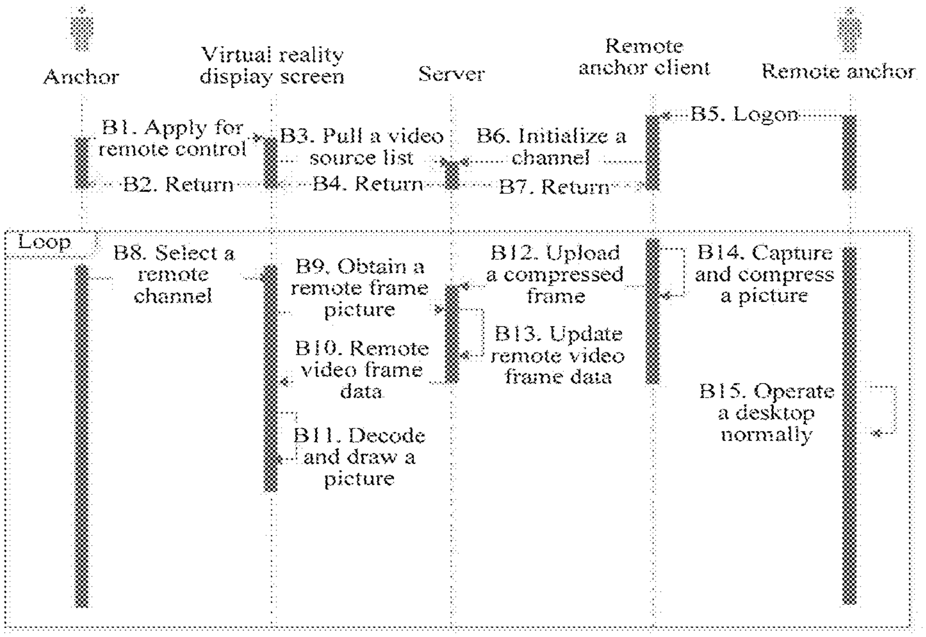
FIG. 15 is a schematic flowchart of a remote mode in an application scenario according to the present disclosure.

It can be learned from the foregoing content that, the user may select a "Remote" mode through the VR display screen to share remote live streaming content. A picture of live streaming is not the desktop of the user's computer, but content pushed by another live streaming user to the server. An anchor in this manner is more like a controller of a television remote control. A process of selecting a remote mode is illustrated in the following with a specific application scenario. FIG. 15 is a schematic flowchart of a remote mode in an application scenario according to the present disclosure. Specifically:

In step B1, an anchor may apply for control in a "Remote" mode, that is, the anchor applies to a VR display screen in a scene for control in a "Remote" mode, and waits for the VR display screen to return an application result.

In step B2, the VR display screen returns an application result according to the application for the "Remote" mode.

In step B3, the VR display screen pulls a video source list, that is, a local VR display screen obtains a current channel resource from a server, and the local VR display screen is presented in a user interface (UI) manner.

In step B4, the server returns an application result according to the application for the channel resource.

In step B5, when step B1 to step B4 is performed, the anchor may log onto a remote anchor client, and the remote anchor client logs onto the server.

In step B6, after the remote anchor logs onto the remote anchor client successfully, the remote anchor client transmits a request for an initial channel and waits for a returned result, where the request is used by the remote anchor client to apply to the server for an assigned live streaming channel.

In step B7, the server returns an application result according to the application for the initial channel.

In step B8, the anchor selects a channel in the "Remote" mode, and the anchor continues to select a scene video source through VR UI interaction.

In step B9, the VR display screen obtains a frame picture in the "Remote" mode from the server, that is, the local VR display screen pulls frame data corresponding to the channel from the server, and the corresponding frame data is stored locally in a form of a YUV420-format array.

In step B10, the server transmits remote video frame data to the VR display screen according to a frame data obtaining request of the VR display screen.

In step B11, the VR display screen performs decoding and draws a frame picture, that is, the local VR display screen decodes YUV420 into three maps corresponding to Y, U, and V channels respectively, restores an original video picture according to the three maps, and draws the original video picture on the VR display screen.

In step B12, the remote anchor client uploads compressed frame data to the server, that is, the remote anchor client uploads frame data, which has been compressed, to the server.

In step B13, the server updates video data in the "Remote", that is, the server updates a video stream buffer in the server according to a video uploaded by the user.

In step B14, the remote anchor client captures a local desktop picture, that is, the remote anchor client captures an anchor computer desktop, and transcodes obtained two-dimensional array data arranged in a form of image data BGRA into a YUV420 data stream that is further compressed by using a service audio and video component.

In step B15, the remote anchor may capture the desktop, compression and uploading are performed in the background, and during this period, the anchor operates the desktop normally.

Figure 16:
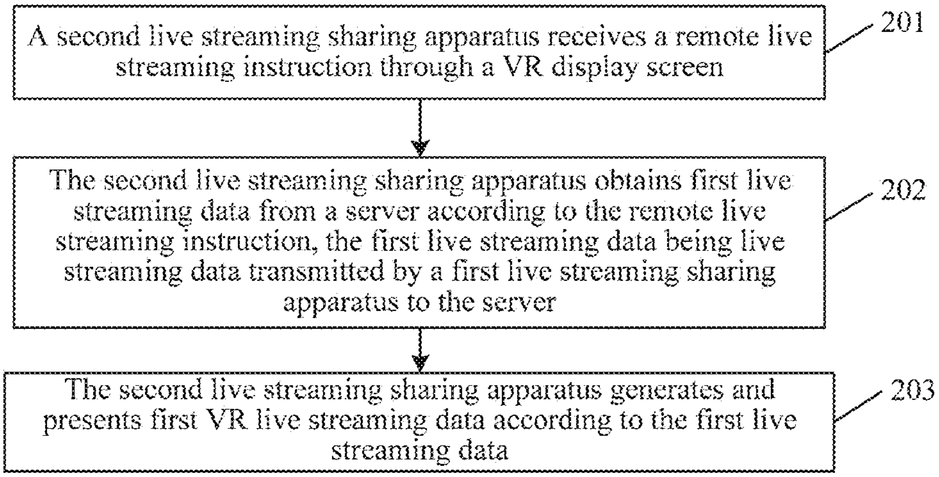
FIG. 16 is a schematic diagram of another embodiment of a live streaming sharing method according to an embodiment of the present disclosure.

A live streaming sharing method in the present disclosure has been described above from the perspective of a first live streaming sharing apparatus. In the following, the live streaming sharing method is described from the perspective of a second live streaming sharing apparatus. The method is applied to a live streaming sharing system, and the live streaming sharing system includes a first live streaming sharing apparatus, a server, and the second live streaming sharing apparatus. Referring to FIG. 16, another embodiment of the live streaming sharing method in the embodiments of the present disclosure includes:

201. The second live streaming sharing apparatus receives a remote live streaming instruction through a VR display screen.

In this embodiment, the second live streaming sharing apparatus receives a remote live streaming instruction transmitted by a user through a VR display screen. The remote live streaming instruction is used for obtaining first live streaming data uploaded by the first live streaming sharing apparatus. The remote live streaming instruction is an instruction for triggering a "Remote" mode.

202. The second live streaming sharing apparatus obtains first live streaming data from the server according to the remote live streaming instruction, the first live streaming data being live streaming data transmitted by the first live streaming sharing apparatus to the server.

In this embodiment, the second live streaming sharing apparatus obtains, from the server according to the remote live streaming instruction, the first live streaming data uploaded by the first live streaming sharing apparatus.

With the development of the Internet technology, the concept of live streaming has new extension and development. Nowadays, more people pay attention to Internet live streaming. Especially, the video live streaming ecological chain attracts more attention. People watch soccer games, sports events, important events, news and the like online through Internet signals. In this way, people can freely choose from lots of options. Definitely, the live streaming technology will have new progresses with the development of the mobile Internet technology. The first live streaming data herein is such live streaming data.

203. The second live streaming sharing apparatus generates and presents first VR live streaming data according to the first live streaming data.

In this embodiment, the second live streaming sharing apparatus converts the first live streaming data and generates corresponding first VR live streaming data. The first live streaming data herein is data that can be directly presented on a terminal device such as a PC or a mobile phone, while the first VR live streaming data is data that can be presented in a VR scene. Generally, a user may wear VR glasses or a VR helmet to watch the first VR live streaming data.

It may be appreciated that, the second live streaming sharing apparatus may also receive a local live streaming instruction triggered by a user through the VR display screen, obtain local second live streaming data of the second live streaming sharing apparatus according to the live streaming instruction, and then transmit the second live streaming data to the server. Subsequently, at least one first live streaming sharing apparatus may download the second live streaming data from the server. Then, the first live streaming sharing apparatus converts the second live streaming data into second VR live streaming data, thereby displaying the second VR live streaming data on a corresponding VR display screen.

The second live streaming sharing apparatus is similar to the first live streaming sharing apparatus in structure and functions. For the steps and method performed by the second live streaming sharing apparatus, reference may be made to the steps and method performed by the first live streaming sharing apparatus. Details are not described herein again.

In this embodiment of the present disclosure, a live streaming sharing method is provided. The method is applied to a live streaming sharing system, and the live streaming sharing system includes a first live streaming sharing apparatus, a server, and a second live streaming sharing apparatus. First, the second live streaming sharing apparatus receives a remote live streaming instruction through a VR display screen, and then obtains first live streaming data from the server according to the remote live streaming instruction. Finally, the second live streaming sharing apparatus generates and presents first VR live streaming data according to the first live streaming data. By using the foregoing method, the second live streaming sharing apparatus can synchronously obtain the first live streaming data transmitted by the first live streaming sharing apparatus, and present the first live streaming data, to achieve the objective of sharing VR content among a plurality of users, thus improving the interactivity and practicability of the solution.

Figure 17:
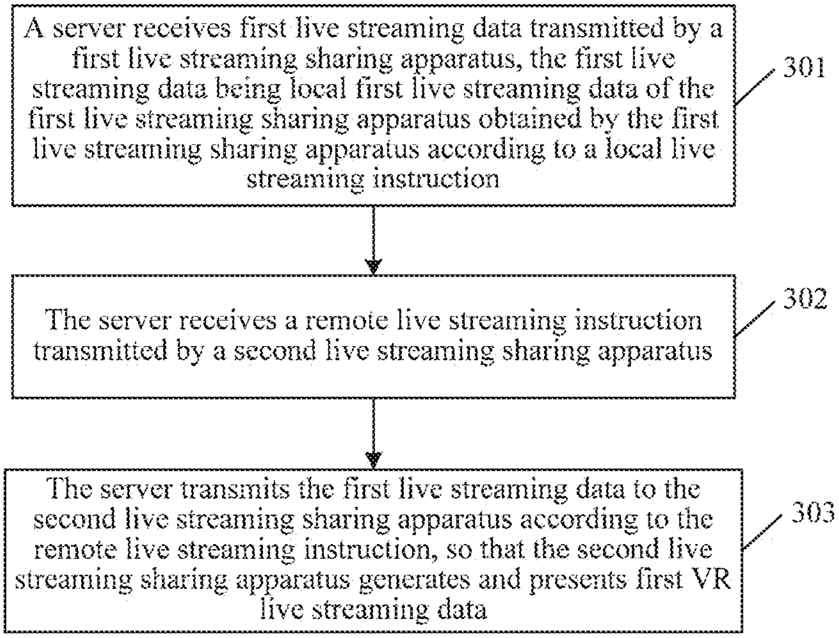
FIG. 17 is a schematic diagram of another embodiment of a live streaming sharing method according to an embodiment of the present disclosure.

A live streaming sharing method in the present disclosure has been described above from the perspectives of a first live streaming sharing apparatus and a second live streaming sharing apparatus. In the following, the live streaming sharing method is described from the perspective of a server. The method is applied to a live streaming sharing system, and the live streaming sharing system includes a first live streaming sharing apparatus, the server, and a second live streaming sharing apparatus. Referring to FIG. 17, another embodiment of the live streaming sharing method in the embodiments of the present disclosure includes:

301. The server receives first live streaming data transmitted by the first live streaming sharing apparatus, the first live streaming data being local first live streaming data of the first live streaming sharing apparatus obtained by the first live streaming sharing apparatus according to a local live streaming instruction.

In this embodiment, first, the server receives first live streaming data transmitted by the first live streaming sharing apparatus. The first live streaming data is triggered by a user through a VR display screen of the first live streaming sharing apparatus, and an instruction for triggering the action is a local live streaming instruction.

302. The server receives a remote live streaming instruction transmitted by the second live streaming sharing apparatus.

In this embodiment, after receiving the first live streaming data, the server may receive a remote live streaming instruction transmitted by at least one second live streaming sharing apparatus. The remote live streaming instruction herein is triggered by a user through a VR display screen of the second live streaming sharing apparatus.

303. The server transmits the first live streaming data to the second live streaming sharing apparatus according to the remote live streaming instruction, so that the second live streaming sharing apparatus generates and presents first VR live streaming data.

In this embodiment, the server transmits the first live streaming data to at least one second live streaming sharing apparatus according to the remote live streaming instruction transmitted by the at least one second live streaming sharing apparatus. Then, the second live streaming sharing apparatus may convert the first live streaming data into first VR live streaming data that can be displayed in a VR environment, and the first VR live streaming data is displayed on the VR display screen in the second live streaming sharing apparatus.

In this embodiment of the present disclosure, a live streaming sharing method is provided. The method is applied to a live streaming sharing system, and the live streaming sharing system includes a first live streaming sharing apparatus, a server, and a second live streaming sharing apparatus. First, the server receives first live streaming data transmitted by the first live streaming sharing apparatus, and then receives a remote live streaming instruction transmitted by the second live streaming sharing apparatus. In this case, the server may transmit the first live streaming data to the second live streaming sharing apparatus according to the remote live streaming instruction, so that the second live streaming sharing apparatus generates and presents first VR live streaming data. By using the foregoing method, the server can synchronize the first live streaming data, so that the second live streaming sharing apparatus can watch, synchronously in a VR scene, live streaming content shared by the first live streaming sharing apparatus, thus improving the feasibility and practicability of the solution.

In some embodiments, based on the embodiment corresponding to FIG. 17, in a first optional embodiment of the live streaming sharing method provided in the embodiments of the present disclosure, the first live streaming data includes an audio and video data stream and state data; and the receiving, by the server, first live streaming data transmitted by the first live streaming sharing apparatus includes:

receiving, by the server, the audio and video data stream transmitted by the first live streaming sharing apparatus;

compressing, by the server, the audio and video data stream in real time, and generating a compressed data stream, the audio and video data being video and audio data in the second live streaming data; and receiving, by the server, the state data transmitted by the first live streaming sharing apparatus, the state data being used for synchronizing playing of the second live streaming sharing apparatus and the first live streaming sharing apparatus.

In this embodiment, the server actually may be at least one server, that is, including a primary server and other servers with auxiliary functions. Definitely, all the functions may be integrated in one server. The manner in which the server processes the first live streaming data is illustrated in the following with drawings and text.

A user may perform a desktop operation and share his/her own desktop in a VR scene. The server may synchronize the desktop to other users in the VR scene. According to different selections made by users, users in each room may share their own VR display screens to others, and may also watch desktops shared by VR display screens of other users in the room. Frame data pictures may be synchronized by using a Tencent Cloud QAV live streaming component. A local anchor desktop may be captured by using a DWM Hook technology or a Windows Desktop Duplication API.

Figure 18:
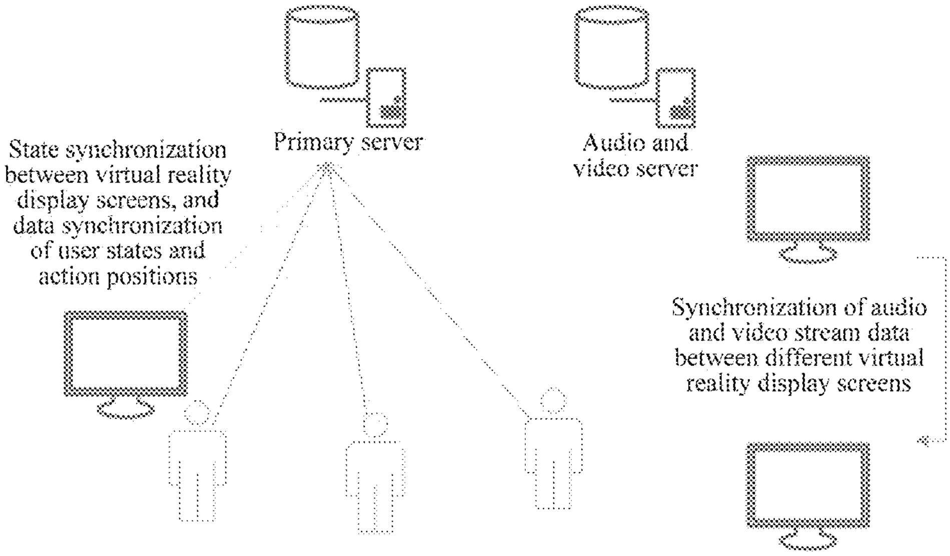
FIG. 18 is a schematic diagram of an embodiment of deployment of a live streaming sharing system according to an embodiment of the present disclosure.

FIG. 18 is a schematic diagram of an embodiment of deployment of a live streaming sharing system according to an embodiment of the present disclosure. As shown in FIG. 18, two servers may be deployed, where a primary server performs data synchronization and processing, and the other server forwards audio and video data streams. Synchronization of state data between a user and a VR display screen mainly relies on the primary server. The server configured to forward audio and video is responsible for synchronizing a picture provided by one user in real time to other users, while other users can participate in live streaming interaction as long as they have VR devices.

Figure 19:
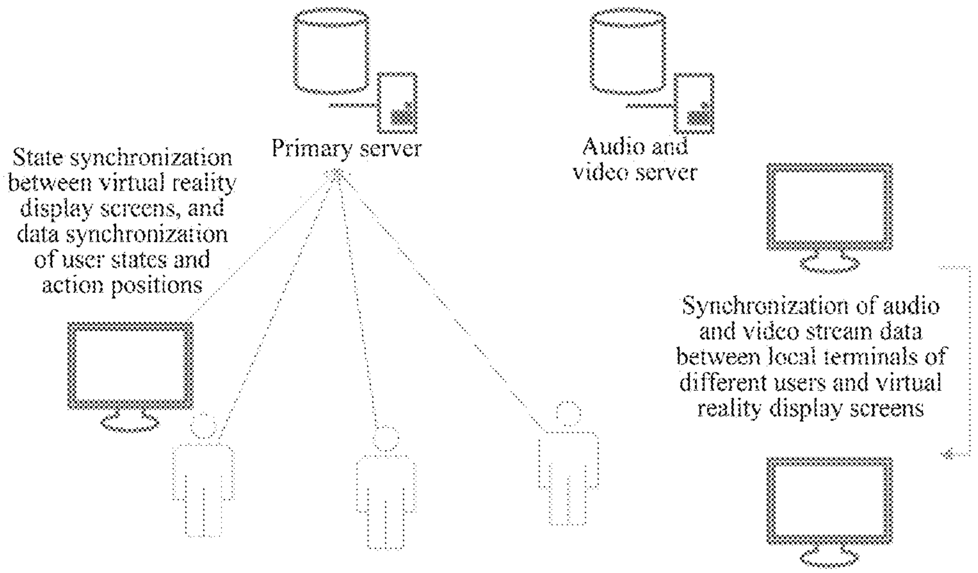
FIG. 19 is a schematic diagram of an audience sequence of a live streaming sharing system according to an embodiment of the present disclosure.

FIG. 19 is a schematic diagram of an audience sequence of a live streaming sharing system according to an embodiment of the present disclosure. The server may push a synchronized frame data stream to at least one VR display screen, and the corresponding frame data is stored locally as an array in a YUV420 format. The local VR display screen decodes YUV420 into three maps corresponding to Y, U, and V channels respectively, restores an original video picture according to the three maps, and draws the original video picture on at least one VR display screen.

In addition, in this embodiment of the present disclosure, the first live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

In some embodiments, based on the embodiment corresponding to FIG. 17, in a second optional embodiment of the live streaming sharing method according to the embodiments of the present disclosure, the method may further include:

receiving, by the server, second live streaming data transmitted by the second live streaming sharing apparatus, the second live streaming data being local second live streaming data of the second live streaming sharing apparatus obtained by the second live streaming sharing apparatus according to a local live streaming instruction;

receiving, by the server, a remote live streaming instruction transmitted by the first live streaming sharing apparatus; and transmitting, by the server, the second live streaming data to the first live streaming sharing apparatus according to the remote live streaming instruction, so that the first live streaming sharing apparatus generates and presents second VR live streaming data.

In this embodiment, first, the server receives second live streaming data transmitted by the second live streaming sharing apparatus. The second live streaming data is triggered by a user through a VR display screen of the second live streaming sharing apparatus, and an instruction for triggering the action is a local live streaming instruction. In this embodiment, after receiving the second live streaming data, the server may receive a remote live streaming instruction transmitted by at least one first live streaming sharing apparatus. The remote live streaming instruction herein is triggered by a user through a VR display screen of the second live streaming sharing apparatus. The server transmits the second live streaming data to at least one first live streaming sharing apparatus according to the remote live streaming instruction transmitted by the at least one first live streaming sharing apparatus. Then, the first live streaming sharing apparatus may convert the second live streaming data into second VR live streaming data that can be displayed in a VR environment, and the second VR live streaming data is displayed on the VR display screen in the first live streaming sharing apparatus.

In addition, in this embodiment of the present disclosure, a live streaming sharing method is provided. The method is applied to a live streaming sharing system, and the live streaming sharing system includes a first live streaming sharing apparatus, a server, and a second live streaming sharing apparatus. First, the server receives second live streaming data transmitted by the second live streaming sharing apparatus, and then receives a remote live streaming instruction transmitted by the first live streaming sharing apparatus. In this case, the server may transmit the second live streaming data to the first live streaming sharing apparatus according to the remote live streaming instruction, so that the first live streaming sharing apparatus generates and presents second VR live streaming data. By using the foregoing method, the server can synchronize the first live streaming data, so that the first live streaming sharing apparatus can watch, synchronously in a VR scene, live streaming content shared by the second live streaming sharing apparatus, thus improving the feasibility and practicability of the solution.

In some embodiments, based on the second embodiment corresponding to FIG. 17, in a third optional embodiment of the live streaming sharing method provided in the embodiments of the present disclosure, the second live streaming data includes an audio and video data stream and state data; and the receiving, by the server, second live streaming data transmitted by the second live streaming sharing apparatus includes:

receiving, by the server, the audio and video data stream transmitted by the second live streaming sharing apparatus;

compressing, by the server, the audio and video data stream in real time, and generating a compressed data stream, the audio and video data being video and audio data in the first live streaming data; and receiving, by the server, the state data transmitted by the second live streaming sharing apparatus, the state data being used for synchronizing playing of the first live streaming sharing apparatus and the second live streaming sharing apparatus.

In this embodiment, a user may perform a desktop operation and share his/her own desktop in a VR scene. The server may synchronize the desktop to other users in the VR scene. According to different selections made by users, users in each room may share their own VR display screens to others, and may also watch desktops shared by VR display screens of other users in the room. Frame data pictures may be synchronized by using a Tencent Cloud QAV live streaming component. A local anchor desktop may be captured by using a DWM Hook technology or a Windows Desktop Duplication API.

The manner in which the server processes the second live streaming data is similar to the manner in which the server processes the first live streaming data in the first optional embodiment corresponding to FIG. 17, and details are not described herein again.

Further, in this embodiment of the present disclosure, the second live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

Figure 20:
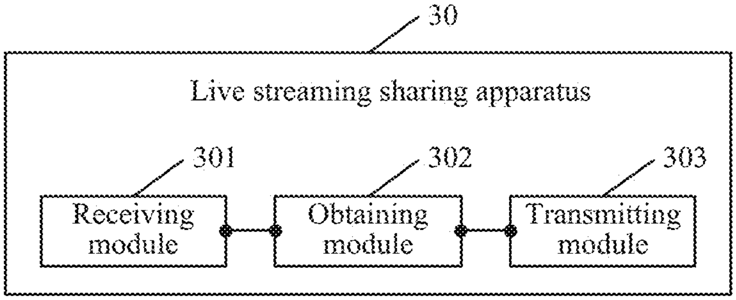
FIG. 20 is a schematic diagram of an embodiment of a live streaming sharing apparatus according to an embodiment of the present disclosure.

A live streaming sharing apparatus in the present disclosure is described in detail below. Referring to FIG. 20, the live streaming sharing apparatus in this embodiment of the present disclosure is applied to a live streaming sharing system, and the live streaming sharing system further includes a server and a second live streaming sharing apparatus. The live streaming sharing apparatus 30 includes:

a receiving module 301, configured to receive a local live streaming instruction through a VR display screen, the VR display screen being used for receiving an operation instruction of a live streaming initiator;

an obtaining module 302, configured to obtain local first live streaming data of the first live streaming sharing apparatus according to the local live streaming instruction received by the receiving module 301; and a transmitting module 303, configured to transmit the first live streaming data obtained by the obtaining module 302 to the server, so that the server transmits the first live streaming data to the second live streaming sharing apparatus, the first live streaming data being used by the second live streaming sharing apparatus to generate and present first VR live streaming data.

In this embodiment, the receiving module 301 receives a local live streaming instruction through a VR display screen, the VR display screen being used for receiving an operation instruction of a live streaming initiator; the obtaining module 302 obtains local first live streaming data of the first live streaming sharing apparatus according to the local live streaming instruction received by the receiving module 301; the transmitting module 303 transmits the first live streaming data obtained by the obtaining module 302 to the server, so that the server transmits the first live streaming data to the second live streaming sharing apparatus, the first live streaming data being used by the second live streaming sharing apparatus to generate and present first VR live streaming data.

In the embodiments of the present disclosure, a live streaming sharing method is provided. The method is applied to a live streaming sharing system, and the live streaming sharing system includes a first live streaming sharing apparatus, a server, and a second live streaming sharing apparatus. The first live streaming sharing apparatus first receives a local live streaming instruction through a VR display screen, then obtains first live streaming data according to the local live streaming instruction, and finally transmits the first live streaming data to the server, so that the server transmits the first live streaming data to the second live streaming sharing apparatus. The second live streaming sharing apparatus presents first VR live streaming data. By using the foregoing method, the second live streaming sharing apparatus can synchronously obtain the first live streaming data transmitted by the first live streaming sharing apparatus, and present the first live streaming data, to achieve the objective of sharing VR content among a plurality of users, thus improving the interactivity and practicability of the solution.

In some embodiments, based on the embodiment corresponding to FIG. 20, in another embodiment of the live streaming sharing apparatus 30 provided in the embodiments of the present disclosure, the obtaining module 302 is specifically configured to obtain a desktop texture through a multimedia programming interface, the desktop texture being captured by using a DWM; and generate the local first live streaming data of the first live streaming sharing apparatus according to the desktop texture, the first live streaming data being bitmap data.

In addition, in this embodiment of the present disclosure, because an API for obtaining desktop bitmap data in the Windows 7 operating system has low efficiency and is thus not suitable for a VR display screen that requires a relatively large quantity of frames, the present disclosure proposes using a full screen capture technology for desktop screen capture in Windows 7. By using the foregoing method, complete bitmap data of each frame, that is, live streaming data, can be obtained with relatively high efficiency in the Windows 7 operating system, and the live streaming data is uploaded to the server, so as to be synchronized to other VR display screens.

In some embodiments, based on the embodiment corresponding to FIG. 20, in another embodiment of the live streaming sharing apparatus 30 provided in the embodiments of the present disclosure, the obtaining module 302 is specifically configured to obtain a desktop texture through a multimedia programming interface, the desktop texture being captured by using a desktop duplication API; and generate the local first live streaming data of the first live streaming sharing apparatus according to the desktop texture, the first live streaming data being bitmap data.

In addition, in this embodiment of the present disclosure, an efficient desktop duplication interface has been introduced in the Windows 8 or Windows 10 operating system. Therefore, the desktop texture can be obtained through the interface, and then the local first live streaming data of the first live streaming sharing apparatus is directly generated according to the desktop texture. By using the foregoing method, complete bitmap data of each frame, that is, live streaming data, can be obtained with relatively high efficiency in the Windows 8 or Windows 10 operating system, and the live streaming data is uploaded to the server, so as to be synchronized to other VR display screens, thus improving the practicability and feasibility of the solution.

Figure 21:
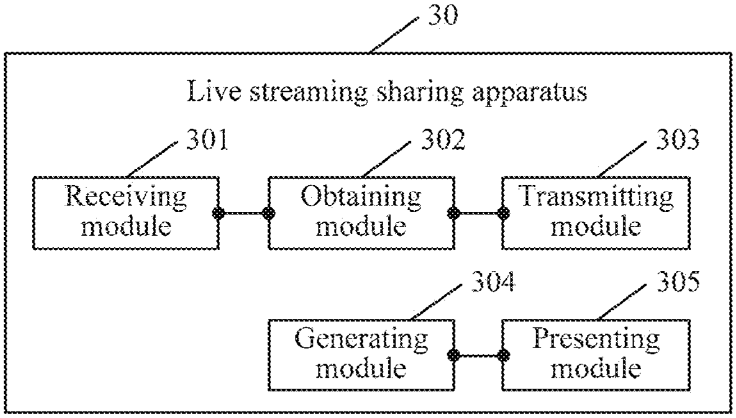
FIG. 21 is a schematic diagram of another embodiment of a live streaming sharing apparatus according to an embodiment of the present disclosure.

In some embodiments, based on the embodiment corresponding to FIG. 20, referring to in FIG. 21, in another embodiment of the live streaming sharing apparatus 30 provided by the embodiments of the present disclosure, the live streaming sharing apparatus 30 further includes a generating module 304 and a presenting module 305, where the generating module 304 is configured to map the first live streaming data to be a map in a GPU after the obtaining module 302 obtains the local first live streaming data of the first live streaming sharing apparatus, to generate the first VR live streaming data; and the presenting module 305 is configured to present the first VR live streaming data generated by the generating module 304.

Further, in this embodiment of the present disclosure, the live streaming sharing apparatus maps live streaming data to be a map in the GPU, to generate VR live streaming data, and then presents the VR live streaming data. By using the foregoing method, drawing of the local desktop can be completed, thus providing a feasible manner of presenting VR live streaming data on a VR display screen and improving the operability of the solution.

In some embodiments, based on the embodiment corresponding to FIG. 20 or FIG. 21, in another embodiment of the live streaming sharing apparatus 30 provided in the embodiments of the present disclosure, the first live streaming data includes an audio and video data stream and state data; and the transmitting module 303 is specifically configured to transmit the audio and video data stream to the server, so that the server compresses the audio and video data stream in real time and generates a compressed data stream, the audio and video data being video and audio data in the first live streaming data; and transmit the state data to the server, so that the server synchronizes playing of the first live streaming sharing apparatus and the second live streaming sharing apparatus according to the state data and the compressed data stream.

Further, in this embodiment of the present disclosure, the first live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

In some embodiments, based on the embodiment corresponding to FIG. 20 or FIG. 21, in another embodiment of the live streaming sharing apparatus 30 provided in the embodiments of the present disclosure, the obtaining module 302 is further configured to obtain a screen ratio value and real-time operation information through the VR display screen after the transmitting module 303 transmits the first live streaming data to the server, the screen ratio value being used for representing a ratio between a space coordinate value and a reference coordinate value, and the real-time operation information being used for representing an operation performed by a user on a controller; and the generating module 304 is further configured to generate a live streaming interaction instruction according to the screen ratio value and the real-time operation information.

Further, in this embodiment of the present disclosure, the user of local live streaming may further generate a live streaming interaction instruction through interaction between the external controller and the VR display screen, and the live streaming interaction instruction is mapped to be a mouse event. By using the foregoing method, the user can directly generate a live streaming interaction instruction in the VR scene, without operating on a terminal desktop, thus realizing immersive VR experience.

In some embodiments, based on the embodiment corresponding to FIG. 20, in another embodiment of the live streaming sharing apparatus 30 provided in the embodiments of the present disclosure, the receiving module 301 is further configured to receive a remote live streaming instruction through the VR display screen;

the obtaining module 302 is further configured to obtain second live streaming data from the server according to the remote live streaming instruction received by the receiving module 301, the second live streaming data being live streaming data transmitted by the second live streaming sharing apparatus to the server; and the generating module 304 is further configured to generate and present second VR live streaming data according to the second live streaming data obtained by the obtaining module 302.

In addition, in this embodiment of the present disclosure, there may be a plurality of VR display screens in a VR scene, and each VR display screen can freely switch between a local mode and a remote mode. By using the foregoing method, social activities in the VR scene seem more abundant, thus improving the diversity and interestingness of the solution.

In some embodiments, based on the embodiment corresponding to FIG. 20, in another embodiment of the live streaming sharing apparatus 30 provided in the embodiments of the present disclosure, the generating module 304 is specifically configured to convert the second live streaming data into the second VR live streaming data according to a correspondence between color codes and color modes; and present the second VR live streaming data.

In addition, in this embodiment of the present disclosure, a method for remote desktop drawing is introduced. A live streaming sharing apparatus may decompose original YUV data into Y, U, and V data streams, and decompose the data into three single-channel maps to be mapped to video memory of a user terminal, so that color reproduction is performed in a pixel coloriser. By using the foregoing method, color reproduction can be directly performed in the stage of drawing a VR display screen, thus improving the efficiency of color reproduction to enhance the practicability of the solution.

In some embodiments, based on the embodiment corresponding to FIG. 20, in another embodiment of the live streaming sharing apparatus 30 provided in the embodiments of the present disclosure, the generating module 304 is specifically configured to update a target map with the second VR live streaming data, the second VR live streaming data including a plurality of VR image frames, the target map including a plurality of data layers, the plurality of data layers being generated after downsampling, and each data layer being used for updating each VR image frame.

Further, in this embodiment of the present disclosure, the live streaming sharing apparatus updates the target map with the VR live streaming data. The second VR live streaming data includes a plurality of VR image frames, and the target map includes a plurality of data layers, the plurality of data layers being generated after downsampling, and each data layer being used for updating each VR image frame. By using the foregoing method, loss of data progress can be reduced, and flicker of the VR display screen when displaying VR live streaming data is reduced, thus improving the application experience.

Figure 22:
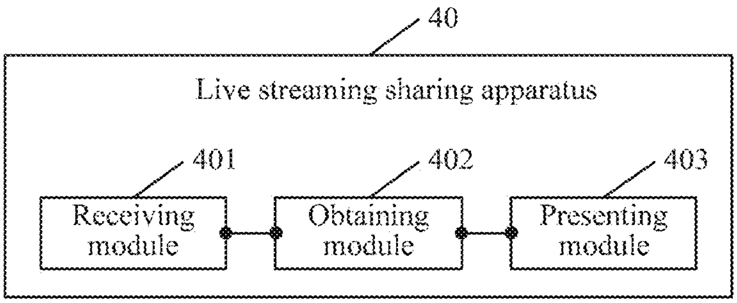
FIG. 22 is a schematic diagram of an embodiment of a live streaming sharing apparatus according to an embodiment of the present disclosure.

A live streaming sharing apparatus in the present disclosure is described in detail below. Referring to FIG. 22, the live streaming sharing apparatus in this embodiment of the present disclosure is applied to a live streaming sharing system, and the live streaming sharing system further includes a server and a first live streaming sharing apparatus. The live streaming sharing apparatus 40 includes:

a receiving module 401, configured to receive a remote live streaming instruction through a VR display screen;

an obtaining module 402, configured to obtain first live streaming data from the server according to the remote live streaming instruction received by the receiving module 401, the first live streaming data being live streaming data transmitted by the first live streaming sharing apparatus to the server; and a presenting module 403, configured to generate and present first VR live streaming data according to the first live streaming data obtained by the obtaining module 402.

In this embodiment, the receiving module 401 receives a remote live streaming instruction through a VR display screen; the obtaining module 402 obtains first live streaming data from the server according to the remote live streaming instruction received by the receiving module 401, the first live streaming data being live streaming data transmitted by the first live streaming sharing apparatus to the server; and the presenting module 403 generates and presents first VR live streaming data according to the first live streaming data obtained by the obtaining module 402.

In the embodiments of the present disclosure, a live streaming sharing method is provided. The method is applied to a live streaming sharing system, and the live streaming sharing system includes a first live streaming sharing apparatus, a server, and a second live streaming sharing apparatus. The first live streaming sharing apparatus first receives a local live streaming instruction through a VR display screen, then obtains first live streaming data according to the local live streaming instruction, and finally transmits the first live streaming data to the server, so that the server transmits the first live streaming data to the second live streaming sharing apparatus. The second live streaming sharing apparatus presents first VR live streaming data. By using the foregoing method, the second live streaming sharing apparatus can synchronously obtain the first live streaming data transmitted by the first live streaming sharing apparatus, and present the first live streaming data, to achieve the objective of sharing VR content among a plurality of users, thus improving the interactivity and practicability of the solution.

In some embodiments, based on the embodiment corresponding to FIG. 22, in another embodiment of the live streaming sharing apparatus 40 provided in the embodiments of the present disclosure, the presenting module 403 is specifically configured to convert the first live streaming data into the first VR live streaming data according to a correspondence between color codes and color modes; and present the first VR live streaming data.

In addition, in this embodiment of the present disclosure, a method for remote desktop drawing is introduced. A live streaming sharing apparatus may decompose original YUV data into Y, U, and V data streams, and decompose the data into three single-channel maps to be mapped to video memory of a user terminal, so that color reproduction is performed in a pixel coloriser. By using the foregoing method, color reproduction can be directly performed in the stage of drawing a VR display screen, thus improving the efficiency of color reproduction to enhance the practicability of the solution.

In some embodiments, based on the embodiment corresponding to FIG. 22, in another embodiment of the live streaming sharing apparatus 40 provided in the embodiments of the present disclosure, the presenting module 403 is specifically configured to update a target map with the first VR live streaming data, the first VR live streaming data including a plurality of VR image frames, the target map including a plurality of data layers, the plurality of data layers being generated after downsampling, and each data layer being used for updating each VR image frame.

Further, in this embodiment of the present disclosure, the live streaming sharing apparatus updates the target map with the VR live streaming data. The first VR live streaming data includes a plurality of VR image frames, and the target map includes a plurality of data layers, the plurality of data layers being generated after downsampling, and each data layer being used for updating each VR image frame. By using the foregoing method, loss of data progress can be reduced, and flicker of the VR display screen when displaying VR live streaming data is reduced, thus improving the application experience.

Figure 23:
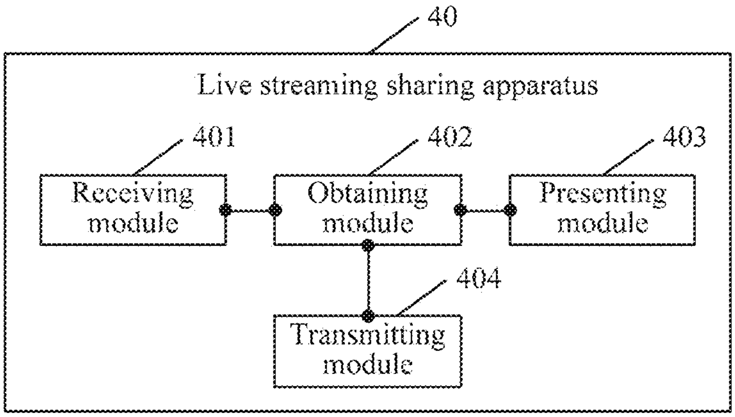
FIG. 23 is a schematic diagram of another embodiment of a live streaming sharing apparatus according to an embodiment of the present disclosure.

In some embodiments, based on the embodiment corresponding to FIG. 22, referring to in FIG. 23, in another embodiment of the live streaming sharing apparatus 40 provided by the embodiments of the present disclosure, the live streaming sharing apparatus 40 further includes a transmitting module 404, where the receiving module 401 is further configured to receive a local live streaming instruction through the VR display screen, the VR display screen being used for receiving an operation instruction of a live streaming initiator;

the obtaining module 402 is further configured to obtain local second live streaming data of the second live streaming sharing apparatus according to the local live streaming instruction received by the receiving module 401; and the transmitting module 404 is configured to transmit the second live streaming data obtained by the obtaining module 402 to the server, so that the server transmits the second live streaming data to the first live streaming sharing apparatus, the second live streaming data being used by the first live streaming sharing apparatus to generate and present second VR live streaming data.

In addition, in this embodiment of the present disclosure, there may be a plurality of VR display screens in a VR scene, and each VR display screen can freely switch between a local mode and a remote mode. By using the foregoing method, social activities in the VR scene seem more abundant, thus improving the diversity and interestingness of the solution.

In some embodiments, based on the embodiment corresponding to FIG. 23, in another embodiment of the live streaming sharing apparatus 40 provided in the embodiments of the present disclosure, the obtaining module 402 is specifically configured to obtain a desktop texture through a multimedia programming interface, the desktop texture being captured by using a DWM; and generate the local second live streaming data of the second live streaming sharing apparatus according to the desktop texture, the second live streaming data being bitmap data.

In addition, in this embodiment of the present disclosure, because an API for obtaining desktop bitmap data in the Windows 7 operating system has low efficiency and is thus not suitable for a VR display screen that requires a relatively large quantity of frames, the present disclosure proposes using a full screen capture technology for desktop screen capture in Windows 7. By using the foregoing method, complete bitmap data of each frame, that is, live streaming data, can be obtained with relatively high efficiency in the Windows 7 operating system, and the live streaming data is uploaded to the server, so as to be synchronized to other VR display screens.

In some embodiments, based on the embodiment corresponding to FIG. 23, in another embodiment of the live streaming sharing apparatus 40 provided in the embodiments of the present disclosure, the obtaining module 402 is specifically configured to obtain a desktop texture through a multimedia programming interface, the desktop texture being captured by using a desktop duplication API; and generate the local second live streaming data of the second live streaming sharing apparatus according to the desktop texture, the second live streaming data being bitmap data.

In addition, in this embodiment of the present disclosure, an efficient desktop duplication interface has been introduced in the Windows 8 or Windows 10 operating system. Therefore, the desktop texture can be obtained through the interface, and then the local second live streaming data of the second live streaming sharing apparatus is directly generated according to the desktop texture. By using the foregoing method, complete bitmap data of each frame, that is, live streaming data, can be obtained with relatively high efficiency in the Windows 8 or Windows 10 operating system, and the live streaming data is uploaded to the server, so as to be synchronized to other VR display screens, thus improving the practicability and feasibility of the solution.

Figure 24:
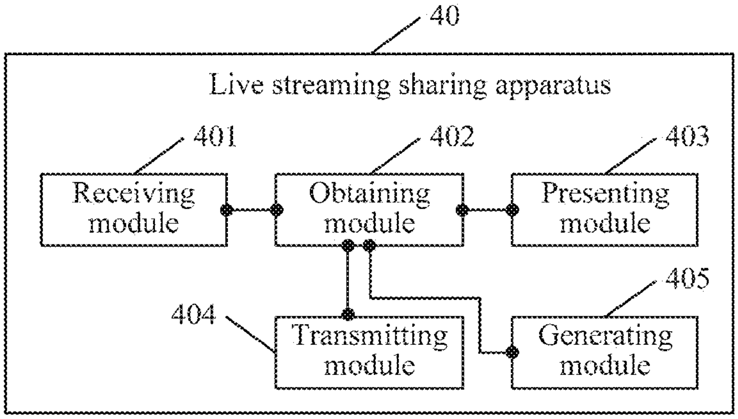
FIG. 24 is a schematic diagram of another embodiment of a live streaming sharing apparatus according to an embodiment of the present disclosure.

In some embodiments, based on the embodiment corresponding to FIG. 23, referring to in FIG. 24, in another embodiment of the live streaming sharing apparatus 40 provided by the embodiments of the present disclosure, the live streaming sharing apparatus 40 further includes a generating module 405, where the generating module 405 is configured to map the second live streaming data to be a map in a GPU after the obtaining module 402 obtains the local second live streaming data of the second live streaming sharing apparatus, to generate the second VR live streaming data; and the obtaining module 402 is further configured to present the second VR live streaming data generated by the generating module 405.

Further, in this embodiment of the present disclosure, the live streaming sharing apparatus maps live streaming data to be a map in the GPU, to generate VR live streaming data, and then presents the VR live streaming data. By using the foregoing method, drawing of the local desktop can be completed, thus providing a feasible manner of presenting VR live streaming data on a VR display screen and improving the operability of the solution.

In some embodiments, based on the embodiment corresponding to FIG. 23 or FIG. 24, in another embodiment of the live streaming sharing apparatus 40 provided in the embodiments of the present disclosure, the second live streaming data includes an audio and video data stream and state data; and the transmitting module 404 is specifically configured to transmit the audio and video data stream to the server, so that the server compresses the audio and video data stream in real time and generates a compressed data stream, the audio and video data being video and audio data in the second live streaming data; and transmit the state data to the server, so that the server synchronizes playing of the second live streaming sharing apparatus and the first live streaming sharing apparatus according to the state data and the compressed data stream.

Further, in this embodiment of the present disclosure, the second live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

In some embodiments, based on the embodiment corresponding to FIG. 23 or FIG. 24, in another embodiment of the live streaming sharing apparatus 40 provided in the embodiments of the present disclosure, the obtaining module 402 is further configured to obtain a screen ratio value and real-time operation information through the VR display screen after the transmitting module 404 transmits the second live streaming data to the server, the screen ratio value being used for representing a ratio between a space coordinate value and a reference coordinate value, and the real-time operation information being used for representing an operation performed by a user on a controller; and the generating module 405 is further configured to generate a live streaming interaction instruction according to the screen ratio value and the real-time operation information obtained by the obtaining module 402.

Further, in this embodiment of the present disclosure, the user of local live streaming may further generate a live streaming interaction instruction through interaction between the external controller and the VR display screen, and the live streaming interaction instruction is mapped to be a mouse event. By using the foregoing method, the user can directly generate a live streaming interaction instruction in the VR scene, without operating on a terminal desktop, thus realizing immersive VR experience.

Figure 25:
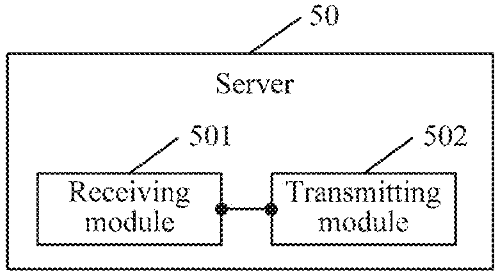
FIG. 25 is a schematic diagram of an embodiment of a server according to an embodiment of the present disclosure.

A server in the present disclosure is described in detail below. Referring to FIG. 25, the server in this embodiment of the present disclosure is applied to a live streaming sharing system, and the live streaming sharing system further includes a first live streaming sharing apparatus and a second live streaming sharing apparatus. The server 50 includes:

a receiving module 501, configured to receive first live streaming data transmitted by the first live streaming sharing apparatus, the first live streaming data being local first live streaming data of the first live streaming sharing apparatus obtained by the first live streaming sharing apparatus according to a local live streaming instruction;

the receiving module 501, configured to receive a remote live streaming instruction transmitted by the second live streaming sharing apparatus; and a transmitting module 502, configured to transmit, according to the remote live streaming instruction received by the receiving module 501, the first live streaming data received by the receiving module to the second live streaming sharing apparatus, so that the second live streaming sharing apparatus generates and presents first VR live streaming data.

In this embodiment, the receiving module 501 receives first live streaming data transmitted by the first live streaming sharing apparatus, the first live streaming data being local first live streaming data of the first live streaming sharing apparatus obtained by the first live streaming sharing apparatus according to a local live streaming instruction; the receiving module 501 receives a remote live streaming instruction transmitted by the second live streaming sharing apparatus; and the transmitting module 502 transmits, according to the remote live streaming instruction received by the receiving module 501, the first live streaming data received by the receiving module to the second live streaming sharing apparatus, so that the second live streaming sharing apparatus generates and presents first VR live streaming data.

In this embodiment of the present disclosure, a live streaming sharing method is provided. The method is applied to a live streaming sharing system, and the live streaming sharing system includes a first live streaming sharing apparatus, a server, and a second live streaming sharing apparatus. First, the server receives first live streaming data transmitted by the first live streaming sharing apparatus, and then receives a remote live streaming instruction transmitted by the second live streaming sharing apparatus. In this case, the server may transmit the first live streaming data to the second live streaming sharing apparatus according to the remote live streaming instruction, so that the second live streaming sharing apparatus generates and presents first VR live streaming data. By using the foregoing method, the server can synchronize the first live streaming data, so that the second live streaming sharing apparatus can watch, synchronously in a VR scene, live streaming content shared by the first live streaming sharing apparatus, thus improving the feasibility and practicability of the solution.

In some embodiments, based on the embodiment corresponding to FIG. 25, in another embodiment of the server 50 provided in the embodiments of the present disclosure, the first live streaming data includes an audio and video data stream and state data; and the receiving module 501 is specifically configured to receive the audio and video data stream transmitted by the first live streaming sharing apparatus; and compress the audio and video data stream in real time, and generate a compressed data stream, the audio and video data being video and audio data in the second live streaming data; and receive the state data transmitted by the first live streaming sharing apparatus, the state data being used for synchronizing playing of the second live streaming sharing apparatus and the first live streaming sharing apparatus.

In addition, in this embodiment of the present disclosure, the first live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

In some embodiments, based on the embodiment corresponding to FIG. 25, in another embodiment of the server 50 according to the embodiments of the present disclosure, the receiving module 501 is further configured to receive second live streaming data transmitted by the second live streaming sharing apparatus, the second live streaming data being local second live streaming data of the second live streaming sharing apparatus obtained by the second live streaming sharing apparatus according to a local live streaming instruction;

the receiving module 501 is further configured to receive a remote live streaming instruction transmitted by the first live streaming sharing apparatus; and the transmitting module 502 is further configured to transmit the second live streaming data to the first live streaming sharing apparatus according to the remote live streaming instruction, so that the first live streaming sharing apparatus generates and presents second VR live streaming data.

In addition, in this embodiment of the present disclosure, a live streaming sharing method is provided. The method is applied to a live streaming sharing system, and the live streaming sharing system includes a first live streaming sharing apparatus, a server, and a second live streaming sharing apparatus. First, the server receives second live streaming data transmitted by the second live streaming sharing apparatus, and then receives a remote live streaming instruction transmitted by the first live streaming sharing apparatus. In this case, the server may transmit the second live streaming data to the first live streaming sharing apparatus according to the remote live streaming instruction, so that the first live streaming sharing apparatus generates and presents second VR live streaming data. By using the foregoing method, the server can synchronize the first live streaming data, so that the first live streaming sharing apparatus can watch, synchronously in a VR scene, live streaming content shared by the second live streaming sharing apparatus, thus improving the feasibility and practicability of the solution.

In some embodiments, based on the embodiment corresponding to FIG. 25, in another embodiment of the server 50 provided in the embodiments of the present disclosure, the second live streaming data includes an audio and video data stream and state data; and the receiving module 501 is specifically configured to receive the audio and video data stream transmitted by the second live streaming sharing apparatus; and compress the audio and video data stream in real time, and generate a compressed data stream, the audio and video data being video and audio data in the first live streaming data; and receive the state data transmitted by the second live streaming sharing apparatus, the state data being used for synchronizing playing of the second live streaming sharing apparatus and the first live streaming sharing apparatus.

Further, in this embodiment of the present disclosure, the second live streaming sharing apparatus may transmit the audio and video data stream and the state data to the server. The server synthesizes the two pieces of data, and implements data synchronization on the side of the first live streaming sharing apparatus and the side of the second live streaming sharing apparatus. By using the foregoing method, the server can synchronize and process logic data and forward the audio and video data stream simultaneously, to synchronize a picture provided by one user in real time to other users in real time, thus realizing live streaming interaction with synchronous picture and sound, and improving the feasibility and experience of the solution.

Figure 26:
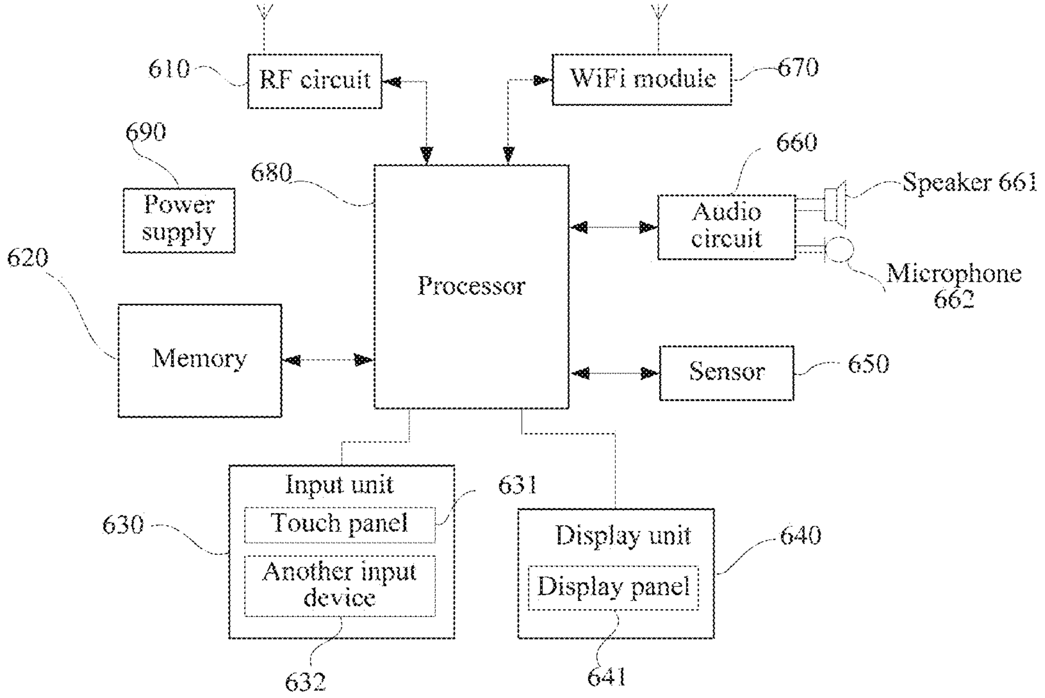
FIG. 26 is a schematic structural diagram of a live streaming sharing apparatus according to an embodiment of the present disclosure.

An embodiment of the present disclosure further provides another live streaming sharing apparatus, as shown in FIG. 26. For ease of description, only a part related to this embodiment of the present disclosure is shown. For specific technical details not disclosed, refer to the method part of the embodiments of the present disclosure. The live streaming sharing apparatus may be any terminal device including a mobile phone, a tablet computer, a personal digital assistant (PDA), a point of sales (POS), and an on-board computer, and the terminal device being a mobile phone is used as an example.

FIG. 26 is a block diagram of a part of structure of a mobile phone related to the terminal provided in this embodiment of the present disclosure. Referring to FIG. 26, the mobile phone includes components such as: a radio frequency (RF) circuit 610, a memory 620, an input unit 630, a display unit 640, a sensor 650, an audio circuit 660, a wireless fidelity (WiFi) module 670, a processor 680, and a power supply 690. A person skilled in the art may understand that the structure of the mobile phone shown in FIG. 26 does not constitute a limitation on the mobile phone, and the mobile phone may include more components or fewer components than those shown in the figure, or some components may be combined, or a different component deployment may be used.

The following makes a specific description of components of the mobile phone with reference to FIG. 26.

The RF circuit 610 may be configured to receive and transmit signals during an information receiving and transmitting process or a call process. Specifically, the RF circuit receives downlink information from a base station, then delivers the downlink information to the processor 680 for processing, and transmits designed uplink data to the base station. Usually, the RF circuit 610 includes, but is not limited to, an antenna, at least one amplifier, a transceiver, a coupler, a low noise amplifier (LNA), and a duplexer. In addition, the RF circuit 610 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 620 may be configured to store a software program and module. The processor 680 runs the software program and module stored in the memory 620, to implement various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 620 may include a high speed random access memory, and may also include a non-volatile memory, such as at least one magnetic disk storage device, a flash memory, or another volatile solid-state storage device.

The input unit 630 may be configured to receive input digit or character information, and generate a keyboard signal input related to the user setting and function control of the mobile phone. Specifically, the input unit 630 may include a touch panel 631 and another input device 632. The touch panel 631 is also referred to as a touchscreen, may collect a touch operation that is performed by a user on or near the touch panel 631 (for example, an operation that is performed by a user by using any appropriate object or accessory such as a finger or a stylus on or near the touch panel 631), and drive a corresponding connection apparatus according to a preset program. In some embodiments, the touch panel 631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 680.

Moreover, the touch controller can receive and execute a command sent from the processor 680. In addition, the touch panel 631 may be implemented by using various types, such as a resistive type, a capacitance type, an infrared type, and a surface acoustic wave type. In addition to the touch panel 631, the input unit 630 may further include another input device 632. Specifically, the input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various menus of the mobile phone. The display unit 640 may include a display panel 641. In some embodiments, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel transfers the touch operation to the processor 680, to determine a type of a touch event. Then, the processor 680 provides a corresponding visual output on the display panel 641 according to the type of the touch event. Although in FIG. 26, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 660, a speaker 661, and a microphone 662 may provide audio interfaces between the user and the mobile phone. The audio circuit 660 may convert received audio data into an electrical signal and transmit the electrical signal to the speaker 661. The speaker 661 converts the electrical signal into a sound signal for output. On the other hand, the microphone 662 converts a collected sound signal into an electrical signal. The audio circuit 660 receives the electrical signal, converts the electrical signal into audio data, and outputs the audio data to the processor 680 for processing. Then, the processor transmits the audio data to, for example, another mobile phone by using the RF circuit 610, or outputs the audio data to the memory 620 for further processing.

Wi-Fi belongs to a short distance wireless transmission technology. The mobile phone may help, by using the Wi-Fi module 670, a user to receive and transmit an email, browse a web page, access stream media, and the like. This provides wireless broadband Internet access for the user. Although FIG. 26 shows the Wi-Fi module 670, it may be understood that the Wi-Fi module is not a necessary component of the mobile phone, and the WiFi module may be omitted as required provided that the scope of the essence of the present disclosure is not changed.

The processor 680 is a control center of the mobile phone, and is connected to various parts of the entire mobile phone by using various interfaces and lines. By running or executing a software program and/or module stored in the memory 620, and invoking data stored in the memory 620, the processor executes various functions of the mobile phone and performs data processing, thereby monitoring the entire mobile phone. In some embodiments, the processor 680 may include one or more processing units. In some embodiments, the processor 680 may integrate an application processor and a modem processor. The application processor mainly processes an operating system, a user interface, an application program, and the like. The modem processor mainly processes wireless communication. It may be understood that the foregoing modem may not be integrated into the processor 680.

The mobile phone further includes the power supply 690 (such as a battery) for supplying power to the components. In some embodiments, the power supply may be logically connected to the processor 680 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present disclosure, the processor 680 included in the terminal also has the following functions:

receiving a local live streaming instruction through a VR display screen, the VR display screen being used for receiving an operation instruction of a live streaming initiator;

obtaining local first live streaming data of the first live streaming sharing apparatus according to the local live streaming instruction; and transmitting the first live streaming data to the server, so that the server transmits the first live streaming data to the second live streaming sharing apparatus, the first live streaming data being used by the second live streaming sharing apparatus to generate and present first VR live streaming data.

In some embodiments, the processor 680 is specifically configured to perform the following steps:

obtaining a desktop texture through a multimedia programming interface, the desktop texture being captured by using a DWM; and generating the local first live streaming data of the first live streaming sharing apparatus according to the desktop texture, the first live streaming data being bitmap data.

In some embodiments, the processor 680 is specifically configured to perform the following steps:

obtaining a desktop texture through a multimedia programming interface, the desktop texture being captured by using a desktop duplication API; and generating the local first live streaming data of the first live streaming sharing apparatus according to the desktop texture, the first live streaming data being bitmap data.

In some embodiments, the processor 680 is further configured to perform the following steps:

mapping the first live streaming data to be a map in a GPU, to generate the first VR live streaming data; and presenting the first VR live streaming data.

In some embodiments, the processor 680 is specifically configured to perform the following steps:

transmitting the audio and video data stream to the server, so that the server compresses the audio and video data stream in real time and generates a compressed data stream, the audio and video data being video and audio data in the first live streaming data; and transmitting the state data to the server, so that the server synchronizes playing of the first live streaming sharing apparatus and the second live streaming sharing apparatus according to the state data and the compressed data stream.

In some embodiments, the processor 680 is further configured to perform the following steps:

obtaining a screen ratio value and real-time operation information through the VR display screen, the screen ratio value being used for representing a ratio between a space coordinate value and a reference coordinate value, and the real-time operation information being used for representing an operation performed by a user on a controller; and generating a live streaming interaction instruction according to the screen ratio value and the real-time operation information.

In some embodiments, the processor 680 is further configured to perform the following steps:

receiving a remote live streaming instruction through the VR display screen;

obtaining second live streaming data from the server according to the remote live streaming instruction, the second live streaming data being live streaming data transmitted by the second live streaming sharing apparatus to the server; and generating and presenting second VR live streaming data according to the second live streaming data.

In some embodiments, the processor 680 is specifically configured to perform the following steps:

converting the second live streaming data into the second VR live streaming data according to a correspondence between color codes and color modes; and presenting the second VR live streaming data.

In some embodiments, the processor 680 is specifically configured to perform the following step:

updating a target map with the second VR live streaming data, the second VR live streaming data including a plurality of VR image frames, the target map including a plurality of data layers, the plurality of data layers being generated after downsampling, and each data layer being used for updating each VR image frame.

In some embodiments, the processor 680 is further configured to perform the following steps:

receiving a remote live streaming instruction through the VR display screen;

obtaining first live streaming data from the server according to the remote live streaming instruction, the first live streaming data being live streaming data transmitted by the first live streaming sharing apparatus to the server; and generating and presenting first VR live streaming data according to the first live streaming data.

In some embodiments, the processor 680 is specifically configured to perform the following steps:

converting the first live streaming data into the first VR live streaming data according to a correspondence between color codes and color modes; and presenting the first VR live streaming data.

In some embodiments, the processor 680 is specifically configured to perform the following step:

updating a target map with the second VR live streaming data, the first VR live streaming data including a plurality of VR image frames, the target map including a plurality of data layers, the plurality of data layers being generated after downsampling, and each data layer being used for updating each VR image frame.

In some embodiments, the processor 680 is further configured to perform the following steps:

receiving a local live streaming instruction through a VR display screen, the VR display screen being used for receiving an operation instruction of a live streaming initiator;

obtaining local second live streaming data of the second live streaming sharing apparatus according to the local live streaming instruction; and transmitting the second live streaming data to the server, so that the server transmits the second live streaming data to the first live streaming sharing apparatus, the second live streaming data being used by the first live streaming sharing apparatus to generate and present second VR live streaming data.

In some embodiments, the processor 680 is specifically configured to perform the following steps:

obtaining a desktop texture through a multimedia programming interface, the desktop texture being captured by using a DWM; and generating the local second live streaming data of the second live streaming sharing apparatus according to the desktop texture, the second live streaming data being bitmap data.

In some embodiments, the processor 680 is specifically configured to perform the following steps:

obtaining a desktop texture through a multimedia programming interface, the desktop texture being captured by using a desktop duplication API; and generating the local second live streaming data of the second live streaming sharing apparatus according to the desktop texture, the second live streaming data being bitmap data.

In some embodiments, the processor 680 is further configured to perform the following steps:

mapping the second live streaming data to be a map in a GPU, to generate the second VR live streaming data; and presenting the second VR live streaming data.

In some embodiments, the processor 680 is specifically configured to perform the following steps:

transmitting the audio and video data stream to the server, so that the server compresses the audio and video data stream in real time and generates a compressed data stream, the audio and video data being video and audio data in the second live streaming data; and transmitting the state data to the server, so that the server synchronizes playing of the second live streaming sharing apparatus and the first live streaming sharing apparatus according to the state data and the compressed data stream.

In some embodiments, the processor 680 is further configured to perform the following steps:

obtaining a screen ratio value and real-time operation information through the VR display screen, the screen ratio value being used for representing a ratio between a space coordinate value and a reference coordinate value, and the real-time operation information being used for representing an operation performed by a user on a controller; and generating a live streaming interaction instruction according to the screen ratio value and the real-time operation information.

Figure 27:
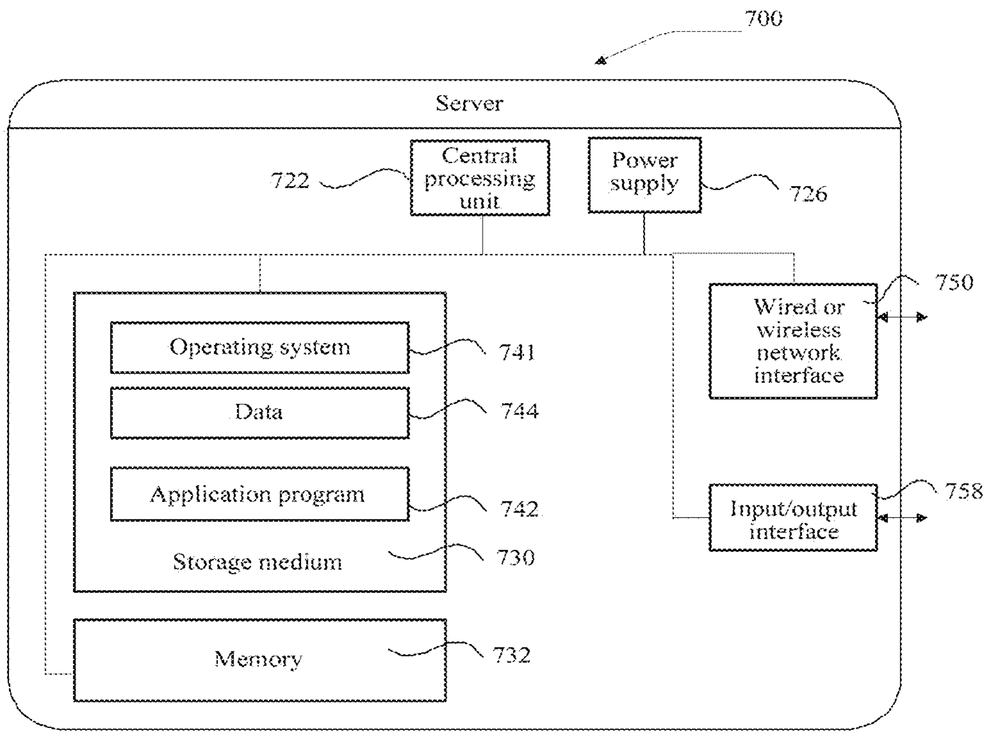
FIG. 27 is a schematic structural diagram of a server according to an embodiment of the present disclosure.

FIG. 27 is a schematic structural diagram of a server according to an embodiment of the present disclosure. The server 700 may vary a lot due to different configuration or performance, and may include one or more central processing units (CPUs) 722 (for example, one or more processors), a memory 732, and one or more storage media 730 (for example, one or more mass storage devices) for storing an application program 742 or data 744. The memory 732 and the storage medium 730 may be transient storage or persistent storage. The program stored in the storage medium 730 may include one or more modules (not marked in the figure), and each module may include a series of instruction operations to the server. Further, the central processing unit 722 may be set to communicate with the storage medium 730, and execute, on the server 700, the series of instruction operations stored in the storage medium 730.

The server 700 may further include one or more power supplies 726, one or more wired or wireless network interfaces 750, one or more input/output interfaces 758, and/or one or more operating systems 741 such as Windows Server™, Mac OS X™, Unix™, Linux™, and FreeBSD™.

The steps performed by the server in the foregoing embodiment may be based on the server structure shown in FIG. 27.

In some embodiments, the CPU 722 is configured to perform the following steps:

receiving first live streaming data transmitted by the first live streaming sharing apparatus, the first live streaming data being local first live streaming data of the first live streaming sharing apparatus obtained by the first live streaming sharing apparatus according to a local live streaming instruction;

receiving a remote live streaming instruction transmitted by the second live streaming sharing apparatus; and transmitting the first live streaming data to the second live streaming sharing apparatus according to the remote live streaming instruction, so that the second live streaming sharing apparatus generates and presents first VR live streaming data.

In some embodiments, the CPU 722 is specifically configured to perform the following steps:

receiving the audio and video data stream transmitted by the first live streaming sharing apparatus;

compressing the audio and video data stream in real time, and generate a compressed data stream, the audio and video data being video and audio data in the second live streaming data; and receiving the state data transmitted by the first live streaming sharing apparatus, the state data being used for synchronizing playing of the second live streaming sharing apparatus and the first live streaming sharing apparatus.

In some embodiments, the CPU 722 is further configured to perform the following steps:

receiving second live streaming data transmitted by the second live streaming sharing apparatus, the second live streaming data being local second live streaming data of the second live streaming sharing apparatus obtained by the second live streaming sharing apparatus according to a local live streaming instruction;

receiving a remote live streaming instruction transmitted by the first live streaming sharing apparatus; and transmitting the second live streaming data to the first live streaming sharing apparatus according to the remote live streaming instruction, so that the first live streaming sharing apparatus generates and presents second VR live streaming data.

In some embodiments, the CPU 722 is specifically configured to perform the following steps:

receiving the audio and video data stream transmitted by the second live streaming sharing apparatus; and compressing the audio and video data stream in real time, and generating a compressed data stream, the audio and video data being video and audio data in the first live streaming data; and receiving the state data transmitted by the second live streaming sharing apparatus, the state data being used for synchronizing playing of the second live streaming sharing apparatus and the first live streaming sharing apparatus.

All or some of the foregoing embodiments may be implemented by using software, hardware, or a combination thereof. When software or a combination of software and hardware is used for implementation, implementation may be entirely or partially performed in the form of a computer program product.

The computer program product includes one or more computer instructions. When the computer program instructions are loaded and executed on a computer, all or some of the processes or functions according to the embodiments of the present disclosure are produced. The computer may be a general-purpose computer, a dedicated computer, a computer network, or another programmable apparatus. The computer instructions may be stored in a storage medium, or transmitted from one storage medium to another storage medium. For example, the computer instructions may be transmitted from a website, a computer, server, or a data center to another website, computer, server, or data center in a wired (for example, a coaxial cable, an optical fiber, or a digital subscriber line (DSL)) or wireless (for example, infrared, radio, or microwave) manner. The storage medium may be any medium accessible by the computer, or a data storage device, such as a server or a data center, including one or more media. The medium may be a magnetic medium (for example, a floppy disk, a hard disk, or a magnetic tape), an optical medium (for example, an optical disc), a semiconductor medium (for example, a solid state disk (SSD)), or the like.

A person of ordinary skill in the art may clearly understand that, for simple and clear description, for specific work processes of the foregoing described system, apparatus, and unit, reference may be made to corresponding process in the foregoing method embodiments, and details are not described herein again.

In the embodiments provided in this application, it is to be understood that the disclosed system, apparatus, and method may be implemented in other manners. For example, the described apparatus embodiment is merely exemplary. For example, the unit division is merely logical function division and may be other division during actual implementation. For example, multiple units or components may be combined or integrated into another system.

The units described as separate parts may or may not be physically separate, and parts displayed as units may or may not be physical units, may be located in one position, or may be distributed on a plurality of network units. Some of or all of the units may be selected according to actual needs to achieve the objectives of the solutions of the embodiments of the present disclosure.

The foregoing embodiments are merely intended for describing the technical solutions of the present disclosure, but not for limiting the present disclosure. A person of ordinary skill in the art may make modifications to the technical solutions described in the foregoing embodiments, and these modifications do not cause the corresponding technical solution to depart from the scope of the claims.

What is claimed is:

1. A live streaming sharing method performed by a server, the method comprising:

receiving, by the server, an application to a VR display screen in a three-dimensional virtual scene transmitted by a first live streaming sharing apparatus, the application including a live streaming instruction;

in response to a determination that the live streaming instruction is a local live streaming instruction:

receiving, by the server, first live streaming data transmitted by the first live streaming sharing apparatus, the first live streaming data being generated according to a desktop texture of the first live streaming sharing apparatus; and transmitting, by the server, the first live streaming data to a second live streaming sharing apparatus, wherein the desktop texture of the first live streaming sharing apparatus is synchronously rendered on the VR display screen in the three-dimensional virtual scene for display on the second live streaming sharing apparatus;

in response to a determination that the live streaming instruction is a remote live streaming instruction:

transmitting, by the server, a video source list including a plurality of video channels, to the first live streaming sharing apparatus; and in response to receiving a selected video channel from the plurality of video channels from the first live streaming sharing apparatus, transmitting, by the server, second live streaming data associated with the selected video channel to the first live streaming sharing apparatus, wherein the second live streaming data associated with the selected video channel is rendered on the VR display screen in the three-dimensional virtual scene for display on the first live streaming sharing apparatus.

2. The method according to claim 1, wherein the first live streaming data comprises an audio and video data stream and state data; and the receiving, by the server, first live streaming data transmitted by the first live streaming sharing apparatus comprises:

receiving, by the server, the audio and video data stream transmitted by the first live streaming sharing apparatus;

compressing, by the server, the audio and video data stream in real time to obtain a compressed data stream, the audio and video data being video and audio data in the first live streaming data; and generating, by the server, the first live streaming data according to the state data and the compressed data stream, the state data being used for synchronizing playing of the second live streaming sharing apparatus and the first live streaming sharing apparatus.

3. The method according to claim 1, further comprising:

receiving, by the server, second live streaming data transmitted by the second live streaming sharing apparatus, the second live streaming data being obtained by the second live streaming sharing apparatus according to a local live streaming instruction;

receiving, by the server, a remote live streaming instruction transmitted by the first live streaming sharing apparatus; and transmitting, by the server, the second live streaming data to the first live streaming sharing apparatus according to the remote live streaming instruction.

4. The method according to claim 3, wherein the second live streaming data comprises an audio and video data stream and state data; and the receiving, by the server, second live streaming data transmitted by the second live streaming sharing apparatus comprises:

receiving, by the server, the audio and video data stream transmitted by the second live streaming sharing apparatus;

compressing, by the server, the audio and video data stream in real time to obtain a compressed data stream, the audio and video data being video and audio data in the second live streaming data; and generating, by the server, the second live streaming data according to the state data and the compressed data stream, the state data being used for synchronizing playing of the first live streaming sharing apparatus and the second live streaming sharing apparatus.

5. A server comprising:

a memory, a transceiver, a processor, and a bus system;

the memory being configured to store a program;

the processor being configured to execute the program in the memory, to perform a live streaming method including:

receiving, by the server, an application to a VR display screen in a three-dimensional virtual scene transmitted by a first live streaming sharing apparatus, the application including a live streaming instruction;

in response to a determination that the live streaming instruction is a local live streaming instruction:

receiving first live streaming data transmitted by the first live streaming sharing apparatus, the first live streaming data being generated according to a desktop texture of the first live streaming sharing apparatus; and transmitting, by the server, the first live streaming data to a second live streaming sharing apparatus, wherein the desktop texture of the first live streaming sharing apparatus is synchronously rendered on the VR display screen in the three-dimensional virtual scene for display on the second live streaming sharing apparatus;

in response to a determination that the live streaming instruction is a remote live streaming instruction:

transmitting, by the server, a video source list including a plurality of video channels, to the first live streaming sharing apparatus; and in response to receiving a selected video channel from the plurality of video channels from the first live streaming sharing apparatus, transmitting, by the server, second live streaming data associated with the selected video channel to the first live streaming sharing apparatus, wherein the second live streaming data associated with the selected video channel is rendered on the VR display screen in the three-dimensional virtual scene for display on the first live streaming sharing apparatus.

6. The server according to claim 5, wherein the first live streaming data comprises an audio and video data stream and state data; and the receiving first live streaming data transmitted by the first live streaming sharing apparatus comprises:

receiving the audio and video data stream transmitted by the first live streaming sharing apparatus;

compressing the audio and video data stream in real time to obtain a compressed data stream, the audio and video data being video and audio data in the first live streaming data; and generating the first live streaming data according to the state data and the compressed data stream, the state data being used for synchronizing playing of the second live streaming sharing apparatus and the first live streaming sharing apparatus.

7. The server according to claim 5, wherein the method further comprises:

receiving second live streaming data transmitted by the second live streaming sharing apparatus, the second live streaming data being obtained by the second live streaming sharing apparatus according to a local live streaming instruction;

receiving a remote live streaming instruction transmitted by the first live streaming sharing apparatus; and transmitting the second live streaming data to the first live streaming sharing apparatus according to the remote live streaming instruction.

8. The server according to claim 7, wherein the second live streaming data comprises an audio and video data stream and state data; and the receiving second live streaming data transmitted by the second live streaming sharing apparatus comprises:

receiving the audio and video data stream transmitted by the second live streaming sharing apparatus;

compressing the audio and video data stream in real time to obtain a compressed data stream, the audio and video data being video and audio data in the second live streaming data; and generating the second live streaming data according to the state data and the compressed data stream, the state data being used for synchronizing playing of the first live streaming sharing apparatus and the second live streaming sharing apparatus.

9. A non-transitory computer-readable storage medium, storing a plurality of computer programs that, when executed by a processor of a server, causes the server to perform a live streaming method including:

receiving, by the server, an application to a VR display screen in a three-dimensional virtual scene transmitted by a first live streaming sharing apparatus, the application including a live streaming instruction;

in response to a determination that the live streaming instruction is a local live streaming instruction:

receiving first live streaming data transmitted by the first live streaming sharing apparatus, the first live streaming data being generated according to a desktop texture of the first live streaming sharing apparatus; and transmitting, by the server, the first live streaming data to a second live streaming sharing apparatus, wherein the desktop texture of the first live streaming sharing apparatus is synchronously rendered on the VR display screen in the three-dimensional virtual scene for display on the second live streaming sharing apparatus;

in response to a determination that the live streaming instruction is a remote live streaming instruction:

transmitting, by the server, a video source list including a plurality of video channels, to the first live streaming sharing apparatus; and in response to receiving a selected video channel from the plurality of video channels from the first live streaming sharing apparatus, transmitting, by the server, second live streaming data associated with the selected video channel to the first live streaming sharing apparatus, wherein the second live streaming data associated with the selected video channel is rendered on the VR display screen in the three-dimensional virtual scene for display on the first live streaming sharing apparatus.

10. The non-transitory computer-readable storage medium according to claim 9, wherein the first live streaming data comprises an audio and video data stream and state data; and the receiving first live streaming data transmitted by the first live streaming sharing apparatus comprises:

receiving the audio and video data stream transmitted by the first live streaming sharing apparatus;

compressing the audio and video data stream in real time to obtain a compressed data stream, the audio and video data being video and audio data in the first live streaming data; and generating the first live streaming data according to the state data and the compressed data stream, the state data being used for synchronizing playing of the second live streaming sharing apparatus and the first live streaming sharing apparatus.

11. The non-transitory computer-readable storage medium according to claim 10, wherein the method further comprises:

receiving second live streaming data transmitted by the second live streaming sharing apparatus, the second live streaming data being obtained by the second live streaming sharing apparatus according to a local live streaming instruction;

receiving a remote live streaming instruction transmitted by the first live streaming sharing apparatus; and transmitting the second live streaming data to the first live streaming sharing apparatus according to the remote live streaming instruction.

12. The non-transitory computer-readable storage medium according to claim 11, wherein the second live streaming data comprises an audio and video data stream and state data; and the receiving second live streaming data transmitted by the second live streaming sharing apparatus comprises:

receiving the audio and video data stream transmitted by the second live streaming sharing apparatus;

compressing the audio and video data stream in real time to obtain a compressed data stream, the audio and video data being video and audio data in the second live streaming data; and generating the second live streaming data according to the state data and the compressed data stream, the state data being used for synchronizing playing of the first live streaming sharing apparatus and the second live streaming sharing apparatus.

* * * * *